US011554479B1

(12) United States Patent
Newman et al.

(10) Patent No.: US 11,554,479 B1
(45) Date of Patent: *Jan. 17, 2023

(54) AUTONOMOUS NAVIGATION AND COLLABORATION OF MOBILE ROBOTS IN 5G/6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: ULTRALOGIC 6G, LLC, Palos Verdes Estates, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/899,864

(22) Filed: Aug. 31, 2022

Related U.S. Application Data

(63) Continuation of application No. 17/337,488, filed on Jun. 3, 2021, now Pat. No. 11,458,615, which is a
(Continued)

(51) Int. Cl.
*B25J 13/00* (2006.01)
*B25J 9/00* (2006.01)
*B25J 9/16* (2006.01)

(52) U.S. Cl.
CPC .......... *B25J 9/0084* (2013.01); *B25J 9/1697* (2013.01); *B25J 13/006* (2013.01)

(58) Field of Classification Search
CPC ........ B25J 9/1697; B25J 19/06; B25J 19/023; B25J 9/0084; B25J 13/006; B25J 9/1682; B25J 9/1676; G05B 2219/39135
See application file for complete search history.

(56) References Cited

U.S. PATENT DOCUMENTS 8,255,092 B2 * 8/2012 Phillips ................ G05D 1/0088
348/113
8,682,502 B2 * 3/2014 Jurmain .................. B25J 5/005
901/6

(Continued)

OTHER PUBLICATIONS

Sudantha et al., Adaptive navigation and motion planning for a mobile track robot, 2017, IEEE, p. 1-5 (Year: 2017).*
(Continued)

*Primary Examiner* — McDieunel Marc
(74) *Attorney, Agent, or Firm* — Mayer & Williams PC

(57) ABSTRACT

5G and especially 6G will enable a multitude of applications for fixed-position and mobile wireless task-devices ("robots"). Most of these applications are based on the assumption that the robots know, or can determine, the locations and wireless identities of other robots in proximity, but this is an unsolved problem. Procedures are provided herein for an arbitrarily large number of fixed-position and mobile robots to autonomously identify each other, determine their locations with speed and precision substantially beyond that provided by navigation satellites, and then to collaborate in performing their tasks, while avoiding interference and collisions. Examples are provided in the fields of automated agriculture, remote oil-spill mitigation, autonomous firefighting, hospital management, construction site coordination, manufacturing (including fully autonomous manufacturing), major product warehousing, airport control, and emergency vehicle access.

12 Claims, 23 Drawing Sheets

Related U.S. Application Data continuation of application No. 17/078,373, filed on Oct. 23, 2020, now abandoned, which is a continuation of application No. 16/422,498, filed on May 24, 2019, now Pat. No. 10,814,474.

(60) Provisional application No. 62/782,672, filed on Dec. 20, 2018, provisional application No. 62/832,499, filed on Apr. 11, 2019, provisional application No. 62/843,867, filed on May 6, 2019.

(56) References Cited

U.S. PATENT DOCUMENTS

| | | | |
|---|---|---|---|
| 9,323,250 B2* | 4/2016 | Wang | B25J 9/1689 |
| 9,682,481 B2* | 6/2017 | Lutz | B25J 5/007 |
| 9,717,387 B1* | 8/2017 | Szatmary | A47L 9/2805 |
| 9,908,239 B1* | 3/2018 | O'Brien | B25J 5/007 |
| 10,527,423 B1* | 1/2020 | Pavlyuk | B64C 39/024 |
| 11,287,272 B2* | 3/2022 | McKenna | G06Q 50/30 |
| 11,458,615 B2* | 10/2022 | Newman | B25J 9/1697 |

OTHER PUBLICATIONS

Lee et al., Use of coded infrared light as artificial landmarks for mobile robot localization, 2007, IEEE, p. 1731-1736 (Year: 2007).*

Arvin et al., A Short-Range Infrared Communication for Swarm Mobile Robots, 2009, IEEE, p. 454-458 (Year: 2009).*

Popa et al., Sensor-based motion control for a mobile robot, 2009, IEEE, p. 335-340 (Year: 2009).*

* cited by examiner

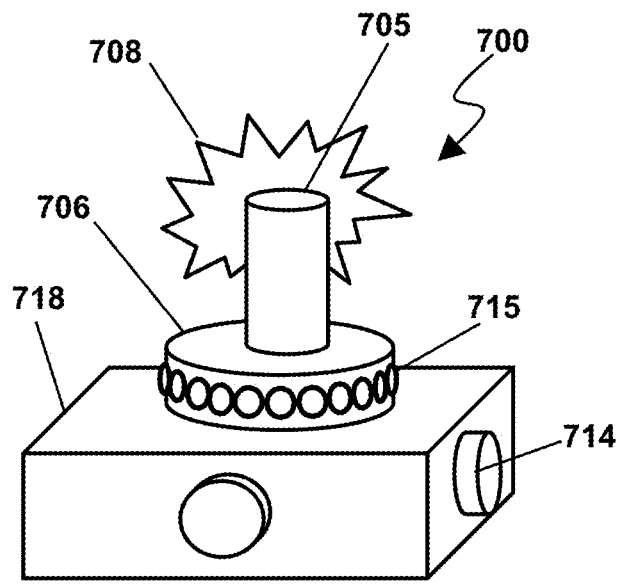
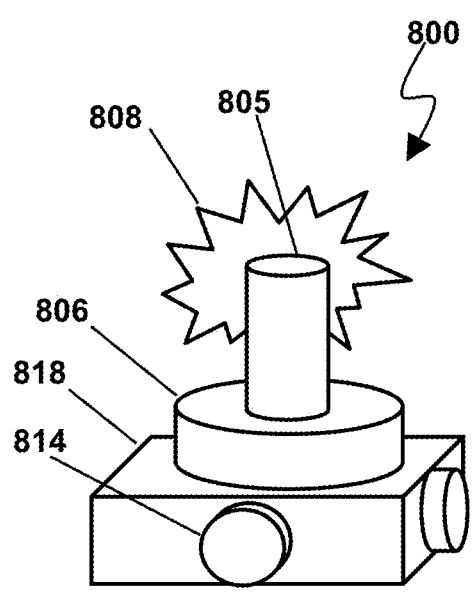
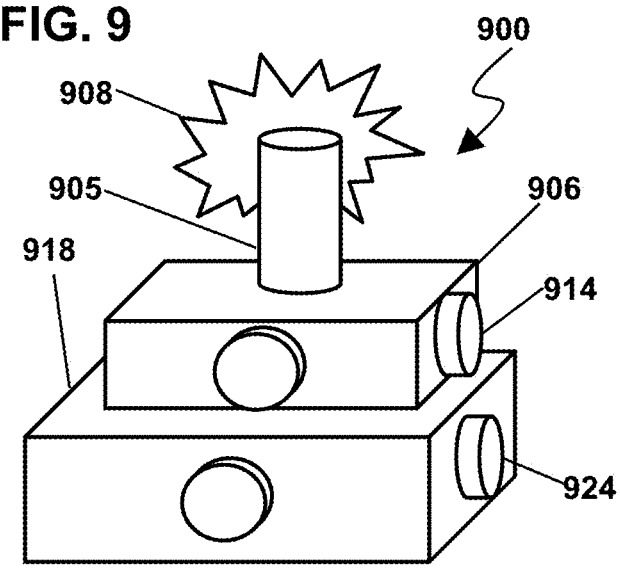
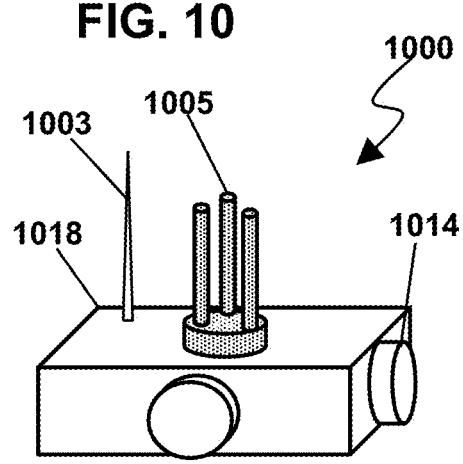

FIG. 15A  (Prior art)
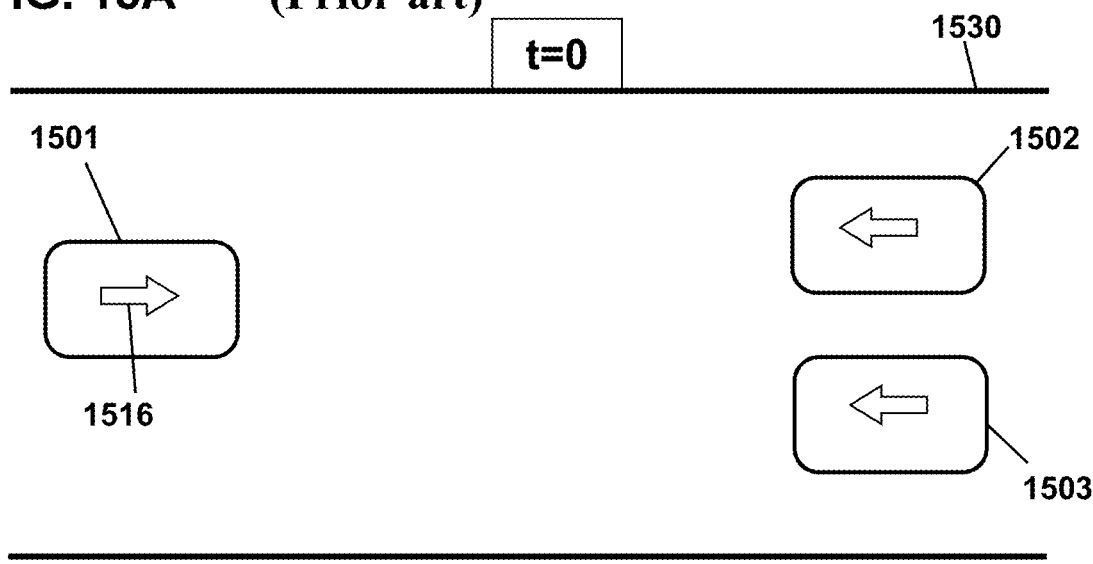
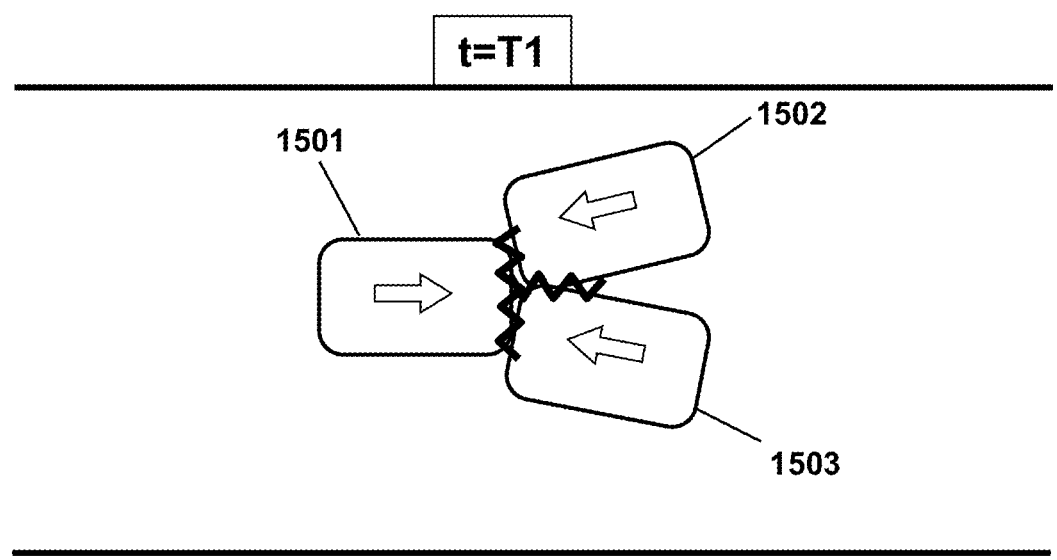

AUTONOMOUS NAVIGATION AND COLLABORATION OF MOBILE ROBOTS IN 5G/6G

PRIORITY CLAIMS AND RELATED APPLICATIONS

This application is a continuation of U.S. patent application Ser. No. 17/337,488, entitled "Collision Avoidance of Mobile Robots", filed Jun. 3, 2021, which is a continuation of U.S. patent application Ser. No. 16/422,498, entitled "Identification and Localization of Mobile Robots", filed Oct. 23, 2020, which is a continuation of U.S. patent application Ser. No. 16/422,498, entitled "Identification and Localization of Mobile Robots", filed May 24, 2019, which claims the benefit of U.S. Provisional Application No. 62/782,672 titled "Infrared Pulse for Autonomous Vehicle Identification" filed Dec. 20, 2018, and U.S. Provisional Application No. 62/832,499 titled "Autonomous Vehicle Localization System" filed Apr. 11, 2019, and U.S. Provisional Application No. 62/843,867 titled "Identification and Localization of Mobile Robots" filed May 6, 2019, which are hereby incorporated by reference in entirety. This application is also related to U.S. Pat. No. 9,896,096, issued Feb. 20, 2018 entitled "SYSTEMS AND METHODS FOR HAZARD MITIGATION" and U.S. patent application Ser. No. 16/148,390, filed Oct. 1, 2018 entitled "Blind Spot Potential-Hazard Avoidance System" the contents of which are incorporated herein by reference in their entireties.

FIELD OF THE INVENTION

The invention relates to systems and methods for short range locating and identification of autonomous mobile robots.

BACKGROUND OF THE INVENTION

Autonomous self-powered self-directed mobile machines ("mobile robots" herein), are expected to greatly increase in the coming decades in areas such as manufacturing, distribution, health care, commercial delivery, warehousing, security, scientific exploration, military, emergency response, and many other areas. The development of powerful low-cost computers, advanced imaging sensors, compact motors, fast networking (such as 5G and 6G), vastly improved software, and efficient energy storage have enabled a wide range of autonomous mobile devices including drones, mobile carts, autonomous heavy equipment, airborne devices, underwater and surface marine robots, plus many others.

Coordination of mobile robots is a continuing challenge, especially when they are used in "swarms" or large numbers of intermingling devices. Typically each device is programmed to perform a task, such as moving items around a warehouse, while avoiding collisions with other robots and people. Mobile robots are not typically programmed to follow any specific route; instead, each robot proceeds in a different way. For optimal productivity and conflict avoidance, each robot should include means for communicating with other robots in proximity. For optimal effectiveness, many of these communications should be individually and specifically directed to a particular other robot, such as a wireless message requesting to a particular other robot that it "Please move north one meter so I can get by". However, current autonomous devices such as mobile robots lack the ability to determine which other robot, among a plurality of other robots in proximity, is associated with which wireless message. Each robot may display markings or other identification, but such markings are often obscured by cargo or dust or other robots, for example. Coordination would be greatly improved if each robot could identify and localize each other robot in proximity.

What is needed is means for autonomous mobile robots to determine which particular robot among a plurality of proximate robots is associated with which identification code and which wireless message, so that they could exchange specifically-addressed messages, greatly improve their cooperation, avoid interference and other problems, and improve the effectiveness of the operation for which they are tasked.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a first robot, proximate to a plurality of mobile robots, the plurality of mobile robots including a particular mobile robot, the first mobile robot configured to: detect a plurality of pulses of visible or infrared light emitted by the particular mobile robot; determine a direction of the pulses of visible or infrared light; determine, according to the direction, which mobile robot, of the plurality of mobile robots, is the particular mobile robot; determine, according to the pulses of visible or infrared light, a code representing a wireless address of the particular mobile robot; and transmit, according to the wireless address, a wireless message to the particular mobile robot.

In a second aspect, there is non-transitory computer-readable media in a processor in a first robot, the media containing instructions that when executed by the processor cause a method to be performed, the method comprising: recording an image that includes a plurality of mobile robots, wherein the plurality of mobile robots includes a particular mobile robot; recording, in the image, a localization signal emitted by the particular mobile robot, the localization signal comprising a plurality of pulses of visible or infrared light; and determining, according to a position of the localization signal in the image, which of the plurality of mobile robots is the particular mobile robot.

In a third aspect, there is a system comprising a fixed-position robot and a mobile robot, wherein: the fixed-position robot is configured to transmit a wireless message and simultaneously emit a localization signal comprising a pulse of visible or infrared light; and the mobile robot is configured to receive the wireless message, and to detect the localization signal, and to measure an arrival direction of the localization signal, and thereby to determine a direction toward the fixed-position robot.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 7 is a sketch in perspective showing an exemplary localization system, according to some embodiments.

FIG. 8 is a sketch in perspective showing another exemplary localization system, according to some embodiments.

FIG. 9 is a sketch in perspective showing a different exemplary localization system, according to some embodiments.

FIG. 10 is a sketch in perspective showing an exemplary simplified localization system, according to some embodiments.

FIG. 15A is a sketch showing sequential positions of three prior-art robots at successive times in which a collision occurs.

DETAILED DESCRIPTION

Figure 1:
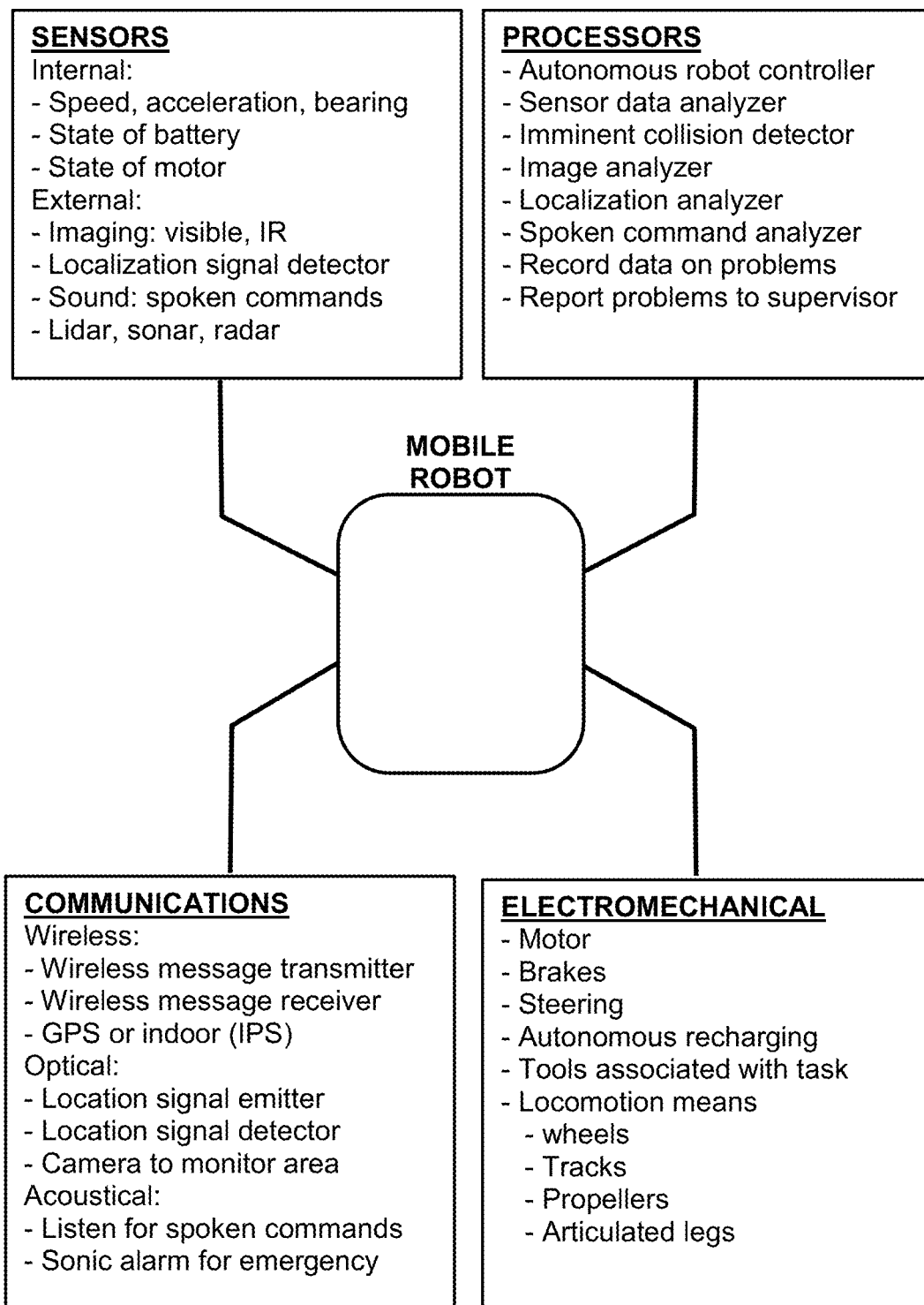
FIG. 1 is a schematic indicating components and subsystems of an exemplary mobile robot, according to some embodiments.

Systems and methods are disclosed that enable autonomously-operated mobile robotic devices, or "robots", to identify and localize other mobile and non-mobile robots in proximity. The disclosed "localization" systems and methods may enable robots to determine which particular robot, among other proximate robots, is associated with a particular identification code and/or which robot is transmitting a particular wireless message. Knowledge of which particular robot is associated with each wireless message can greatly enhance the ability of the robots to cooperate with each other in avoiding collisions and enhancing efficiency. By knowing which particular robot, at which particular location, is associated with each identification code and each wireless message, the robots can cooperate by communicating with each other, thereby avoiding conflicts and enhancing performance of their assigned tasks.

The localization systems and methods may include a localization signal comprising pulsed energy which may be emitted by each of the mobile robots. Other robots in the vicinity may detect the localization signal and may also determine the direction of the localization signal, thereby determining the direction of the emitting robot relative to the receiving robot. Each robot may also compare the direction of the localization signal to an image (such as a camera image) that shows the emitting robot, and may thereby determine which particular robot, among a plurality of robots in proximity, emitted the localization signal. The localization signal thus may serve as a semaphore indicating which particular robot is emitting the localization signal at any particular time. In addition, the localization signal may be coupled with a wireless message, so that other robots can receive the wireless message and thereby establish which robot is transmitting that particular wireless message; namely, whichever robot is also emitting the localization signal. For example, the wireless message and the localization signal may be synchronous or simultaneous or otherwise correlated in time; the wireless message and the localization signal may at least partially overlap in time; the wireless message may occur first with the localization signal beginning as the wireless message ends; the localization signal may start first and the wireless message may begin as the localization signal ends; or other temporal relationship between the wireless message and the localization signal. Moreover, the localization signal may be emitted synchronously with, or responsive to, a particular icon in the wireless message, such as a word or code or bit pattern or other feature of the wireless message. As used herein, "synchronous" means having a temporal relationship, so that the wireless message and the localization signal are synchronous when they have a temporal relationship with each other. For example, the wireless message and the localization signal may be generated at the same time, or they may partially overlap, or the localization signal may begin when the wireless message ends, or the wireless message may begin when the localization signal ends, or the localization signal my be emitted following an indication in the wireless message that a localization signal is about to be emitted, or other temporal relationship that enables a receiving robot to associate the localization signal with the corresponding wireless message.

Each mobile robot may have an associated identification code. Preferably each identification code is unique or otherwise protected against duplication among proximate robots. In some embodiments, the self-identifying code may be transitory and may be used only for an immediate set of interactions, while in other embodiments each robot may have a permanently assigned identification code, respectively. The wireless message may include the identification code of the transmitting robot, in which case the other robots can receive both the localization signal and the wireless message, and thereby associate the identification code with the particular robot that synchronously emitted the localization signal. By determining the identification code of each robot, the robots can subsequently communicate with each other using wireless messages, advantageously with knowledge of which particular robot is transmitting. The wireless message may also be "specifically" addressed to one of the robots when the message includes the identification code of the intended recipient, along with an indication that the identification code is that of the intended recipient. Upon receiving a message that includes the particular robot's identification code as the intended recipient, the particular robot with that specified identification code can respond to the message. Other robots, whose identification codes do not match the specified recipient identification code, can then ignore the message. For example, the wireless message can mention the identification code of the transmitting robot to indicate which robot is the source of the message (along with an indication that the mentioned code is that of the transmitter robot), and may also specify the identification code of a particular recipient robot for which the message is intended (along with an indication that the specified code is that of the intended recipient). In addition, each robot may store the identification code of each robot thus identified and, by tracking the other robots as they move, may be able to send messages to particular robots using the stored identification code values. With the identification codes thus stored, it may not be necessary to repeat the localization signal upon each wireless message, since the identification code of the transmitting robot is included in the wireless message and the other robots already know which one is associated with each code.

To consider a particular example, a first robot may transmit a wireless message that includes its own identification code, and may simultaneously emit a localization signal such as a light pulse or a sound pulse. A second robot can detect the localization signal using, for example, a camera or a directional light detector or a directional sound detector, and can thereby determine a direction toward the first robot relative to the second robot. In addition, the second robot can compare the direction of the emitting robot to an image or other spatial distribution that includes various robots in proximity, thereby determining which of those robots is the first robot. The second robot thereby determines which particular robot is associated with the concurrent wireless message as well as the identification code of the particular robot. Each of the other robots can then perform the localization procedure likewise, by transmitting wireless messages and localization signals synchronously. The other robots can detect the wireless message and the localization signal, and can thereby localize each other robot. This localization processes may continue until each of the robots within range, or proximate to the first robot, have been localized by the other robots, based for example on the number of robots visible to the first robot. Knowledge of which direction is associated with each wireless message provides improved situation awareness for each robot. In addition, determining which spatially localized robot has each identification code can enable much better cooperation between the robots by enabling them to send messages specifically to a particular other robot at a particular location.

Various modes of operation are possible. In a first embodiment (Mode-1), each robot emits a localization signal upon each wireless message. Other robots can determine which robot is transmitting each message by detecting the concurrent localization signal. In a second embodiment (Mode-2), each robot emits an initial localization signal while synchronously transmitting a wireless message that contains the transmitting robot's identification code. Other robots can receive the wireless message and the localization signal, record the identification code from the wireless message, and determine which particular robot is associated with that identification code according to the direction of the localization signal. Each robot may communicate wirelessly thereafter, by including their identification code in each wireless message, without having to repeat the localization process each time. In a third embodiment (Mode-3), each robot emits a localization signal that is modulated to encode the emitting robot's identification code, with or without a concurrent wireless message. Other robots can detect and decode the encoded localization signal, and can also determine the direction of the localization signal, thereby determining which particular robot is associated with the identification code. Thereafter, the robots can communicate wirelessly by including their identification code in each wireless message, without having to repeat the localization signal.

The localization system may include means for transmitting and receiving wireless messages such as Wi-Fi or Bluetooth transceivers, and means for emitting and detecting pulsed localization signals that indicate the direction of the emitting robot such as infrared photodiodes and infrared cameras, and means for determining the direction of each localization signal such as a processor configured to analyze data from each of a plurality of collimated detectors aimed in different directions. The localization system may further include means for comparing the direction of the localization signal to the directions of robots in range such as a processor configured to perform image analysis on images from the infrared camera, and processor means for processing the detection data to determine which particular robot is the emitting robot. The system may include a processor configured to control the wireless transmission and reception processes, the localization signal emission and detection processes, the imaging process, and the determination of the direction of the localization signal. Each robot in range that has a compatible localization system may participate in the localization procedure with each of the other robots. Each robot thus equipped may thereby obtain enhanced communication and cooperation with the other participating robots.

While the examples provided herein are primarily directed toward mobile robots, the same systems and methods are applicable to other autonomously operated machines that are equipped with automatic means for emitting or detecting the localization signals. In some embodiments, the systems and methods may be applicable to communication between mobile robots and non-mobile devices such as fixed-location markers, fixed-site robots, and other devices that lack mobility. Embodiments may be applicable to communications between two non-mobile robots that interact with each other by, for example, passing items between each other or alerting each other of a condition change. Embodiments may be applicable to vehicles capable of carrying humans, whether human-driven or fully autonomous or semi-autonomous (such as automatic lane-keeping or cruise-control systems) or temporarily autonomous (such as emergency intervention systems or automatic braking systems), so long as the vehicles include means for emitting and/or detecting localization signals. As autonomous vehicles increasingly intermingle with human-driven vehicles on roadways, mutual localization and cooperation will be increasingly important to avoid conflicts. In addition, the systems and methods may be applicable to communications between mobile robots and humans carrying portable systems for emitting and detecting the localization signals, thereby enabling the mobile robots to avoid interfering with the proximate humans. In other embodiments, the localization signal or the wireless message may be configured to do something to the receiving robots, such as to cause the receiving robots to stop in place, or change an operational parameter, or initiate communication with a central computer, or other action. In a further embodiment, an emergency vehicle such as a police car may include a localization system to communicate with other non-emergency vehicles, for example to instruct the non-emergency vehicles to get out of the way or to pull over in various circumstances. An emergency vehicle or other vehicle may be configured to specifically communicate with a fixed-location robot such as a traffic signal or other device, and may cause the fixed-location robot to take an action such as to turn lights on or off, for example.

A mobile robot is "mobile" if it is self-propelled using an on-board motor with stored power, and has a means of locomotion such as wheels, tracks, propellers, articulated legs, wings, or the like. A robot is "autonomous" if it is operated solely or primarily by an on-board processor (after being instructed as to task by a human or a remote processor) with no or at most occasional instructions from a remote processor and/or a human while performing the task. In the examples, a "first robot" is a particular robot in which the localization system is installed. The "second robot" is another robot proximate to the first robot. The second robot is "proximate" to the first robot if they are close enough to cooperate in avoiding collisions. The second robot is "within range" of the first robot if they can exchange wireless messages. "Optical" means infrared or visible light. "RF" means radio-frequency energy. An "electromagnetic pulse" is a pulse of electromagnetic energy such as visible light, infrared light, or RF energy. The second robot is "detectable" to the first robot if the localization signal detector of the first robot can detect the localization signals (such as sonic or electromagnetic pulses) emitted by the second robot, and also the imaging device of the first robot can image the second robot. A wireless message or other message is "specific" if the message is addressed to a particular recipient using, for example, an included identification code of the intended recipient. Thus a hailing message is not specific. The "localization procedure" is a method or process of transmitting wireless messages and associated localization signals to other robots, and of receiving wireless messages and localization signals from other robots, and determining which robot has transmitted each wireless message. "Localizing" a robot means determining a direction toward the robot, and may also include determining which particular robot, among a plurality of detectable robots, has emitted a localization signal. Both of the first and second robots, and any other robots in range, may have a localization system installed and may determine which robot is associated with which wireless message. As used herein, a "drone" is a self-propelled device capable of moving in two dimensions, such as horizontally, or three dimensions, such as vertically and horizontally. Examples of drones include all unoccupied aerial vehicles (UAV's), including but not limited to helicopters, hovercraft, airplanes, and/or autonomous aircraft of all descriptions. Further examples of drones include unoccupied underwater vehicles (UUV's) such as submarines, mini-subs, submersible mobile devices, and/or underwater craft of all descriptions. An "imminent" collision is a possible future collision that may occur within a short time, such as 1 second or 10 seconds, if no avoidance actions are taken. The localization signal is "pulsed" if it includes one or more separate intervals of emitted energy, such as sonic or infrared or visible or RF energy, typically having a duration of 1 nanosecond to 100 milliseconds.

Each robot may include an autonomous robot controller, such as a processor configured to plan and/or implement the motions of that particular robot. The autonomous robot controller, or other processor, may be configured to perform tasks cooperatively with other robots. The autonomous robot controller, or other processor, may also be configured to detect an imminent collision, and to cooperate with other autonomous robots in avoiding the collision. Often such cooperation depends on knowing the location and identification of each of the other robots, or at least the directions of the other robots relative to the first robot. For example, the processor may be configured to select a first sequence of actions for the first robot to implement and a second sequence of actions for the second robot to implement, so that together they can perform a cooperative task or avoid a collision. However, such cooperation depends on each robot having already determined where each other robot is located.

If the first robot cannot associate each wireless message with a particular robot, then cooperation is hindered. The localization systems and methods according to the present disclosure may provide an association between each robot's location and its wireless messages.

Turning now to the figures, FIG. 1 is a schematic of an exemplary autonomous robot including sensors, processors, communications systems, and electromechanical systems. The sensors may include internal sensors configured to measure the speed, acceleration, and/or bearing of the robot, the state of the battery and motor, among others. The sensors may also include external sensors configured to measure data about other robots using subsystems such as lidar, radar, sonic, and/or Doppler systems to measure data such as distances and/or speeds of other robots. The sensors may include cameras in visible and/or infrared light, directional detectors based on sound or visible/IR light or RF, and any other sensors on the robot. The terms "internal" and "external" generally refer to the location of aspects being measured by the sensors, and not necessarily the locations of the sensors themselves.

The processors may include one or more physical processing modules, configured to autonomously operate the robot. The processors may include a processor configured to drive the robot to its destination. The processors may include a processor configured to plan and/or implement a driving route autonomously, according to the parameters of whatever task that the robot is to perform. The processors may include a processor configured to act cooperatively with other robots in performing tasks. The processors may include a processor configured to detect other robots, a processor configured to project robot motions forward in time and thereby to detect an imminent collision, and a processor configured to devise and calculate sequences of actions (such as accelerations, decelerations, and steering of the robot) to enhance cooperation and/or avoid interference and/or to avoid collisions with other robots. A processor may be configured to implement the selected sequence of actions by transmitting suitable signals to the motor and/or steering and/or other subsystems of the robot according to the selected sequence.

The processors may include a processor configured to analyze wireless messages, and/or a processor configured to analyze localization signals from other robots. A processor may be configured to determine which robot, among a plurality of robots proximate to the first robot, transmitted the wireless message. A processor may be configured to extract and record a robot identification code contained in the wireless message and/or in the localization signal. A processor may be configured to analyze a camera image or a directional sound/ultrasound/infrared/visible/RF receiver or other directional detector data. A processor may detect robots proximate to the first robot spatially, such as robots represented in the image and/or detected in the detector data. A processor may detect a localization signal in the image and/or the detector data, and may spatially correlate the localization signal with a particular one of the other robots proximate or relative to the first robot, thereby determining which of the other robots emitted the localization signal. The image or directional data may include both the localization signal and the proximate robots together; alternatively, the proximate robots may be imaged separately from the localization signal and subsequently correlated by, for example, image analysis. The localization signal may be detected by a directional detector which is an imaging type detector, such as an infrared camera, or it may be detected by a non-imaging directional detector such as an array of separately-directed receivers such as an array of sonic or optical or RF detector elements. When the localization signal detector is a non-imaging type, a processor may be configured to analyze data from each of the separate directional detector elements, and thereby determine the direction of the localization signal. A processor may be configured to track or follow the position or direction of another robot using, for example, image processing or other suitable time-sequential measurement means. A processor may be configured to associate wireless messages that include a particular robot identification code with a particular robot that was previously localized using an earlier localization signal.

The processors may comprise a computing environment optionally associated with non-transitory computer-readable media. The computing environment may include a computer, CPU, GPU, microprocessor, microcontroller, digital signal processor, ASIC, or other digital electronic device capable of analyzing data from sensors and preparing a task-cooperation or collision-avoidance sequence of actions, which may include controlling the acceleration or deceleration or steering of the subject robot according to the sequence of actions. The computing environment may include one or more processors, each processor being configured to perform one or more of the computing tasks, including such tasks as autonomously driving the subject robot, analyzing sensor data, calculating future positions of robots, detecting and avoiding a possible collision, selecting a sequence of actions to implement, and implementing the sequence of actions. The non-transitory computer-readable media comprise any digital data storage media capable of storing instructions such as software instructions that, when executed, cause the computing environment to perform a method for causing the robot to perform a task solo or in cooperation with other robots, avoid interfering with other robots or humans or other items, avoiding a collision with any of the above, and reporting any unresolvable problems to a central computer and/or a human supervisor. Examples of such media include rotating media such as disk drives and CD's, solid-state drives, permanently configured ROM, detachable memories such as removable drives and micro-SD memories, and the like, in contrast to more transitory media such as a computer's working memory (RAM, DRAM, cache RAM, buffers, and the like).

The communications module may include wireless means for communication between robots and for communication with other receivers such as a central supervisory computer, a human supervisor, a responsive boundary marker or other marker, or other devices with which the robot can communicate. The communication module may further include receivers such as GPS and internet receivers for weather and map data, and the like. The communications module may include a wireless transmitter and a wireless receiver such as a radio-frequency transceiver. The communications module may further include sonic or optical communication means such as a light pulse or infrared pulse or sonic pulse or RF pulse emitter, configured to emit a robot localization signal such as a sonic or high-frequency RF or visible or infrared light pulse or a series of such pulses. The communications module may further include a localization signal detector configured to detect localization signals such as sonic or RF or visible or infrared pulses. The localization signal detector may be an imaging-type detector, or a directional detector, or otherwise configured to determine the direction of a localization signal.

Means for wireless communication may include radio-frequency transmitters and receivers, or alternatively transceivers. Optical imaging means may include still or video cameras sensitive to infrared and/or visible light. The optical imaging means may be sensitive to the localization signal, and may thereby determine the direction of the emitting robot by detecting the direction of the localization signal. Alternatively, the optical imaging means may be sensitive to light from robots but insensitive to the localization signals, in which case a separate localization signal detector may be included to detect the energy pulse of the localization signal separately from the imaging. If so, such a localization signal detector may be a directional detector configured to determine the direction of an arriving localization signal. Means for emitting localization signals may include light-emitting diodes (LEDs) or other types of lamps, configured to emit one or more pulses, in the infrared or visible or other light bands. Alternatively, the localization signals may comprise pulses of sound or ultrasound or other atmospheric vibrational energy (collectively, "sound" herein), in which case the localization signal emitter may include a speaker or other sound generator, and the localization signal directional detector may include a plurality of spaced-apart microphones in an array, or one or more directionally focused microphones or other sonic detectors, along with a processor configured to compare data from each sonic detector and thereby determine the direction of the emitting robot.

The localization signal may comprise pulsed energy. For example, the localization signal may include one or more electromagnetic energy pulses, such as an RF or infrared or visible light pulse or a series of such pulses. Alternatively, the localization signal may include sonic energy including one pulse or a series of sonic pulses, at one frequency or a number of different frequencies. The localization signal detector may be an imaging type sensor such as a camera or a plurality of cameras, or a non-imaging directional detector or a plurality of such detectors, or other suitable detector configured to determine the direction of the localization signal. The localization signal detector may be configured to image the second robot concurrently with the localization signal on the same image, such as an image that records both visible and infrared light, thereby determining directly from the image which robot is the emitting robot. Alternatively, the localization signal detector may be configured to measure the direction of the localization signal, while an optional separate imager may be configured to image the second robot, in which case the processor may be configured to correlate the measured direction of the localization signal with the particular robot in the image that is in the same direction as the localization signal, and thereby determine which robot is associated with which identification code.

The robot identification code is a code or data suitable for identifying each robot among other proximate robots. The robot identification code may be a serial number, a random alphanumeric string, a string of bits, or other robot-identifying code. The identification code may include information about the robot such as the type of robot, whether it is fixed or mobile, whether it is capable of emitting or detecting localization signals, and other properties of the robot. Preferably each robot has a unique identification code, or at least each code is sufficiently detailed that two robots with the same identification code would be unlikely to be in range of each other. In some embodiments, a particular robot may be configured to determine when another robot has the same identification code as the particular robot, and responsively may change its own identification code permanently by, for example, adding a randomly selected number or letter to the end of its code. In this way, each robot can detect when another robot asserts the same identification code in a wireless message, and can then revise its own identification code, thereby causing each robot to have a different code thereafter. Each robot may transmit its identification code in a wireless message. Each robot may emit a localization signal that includes the identification code encoded in, for example, a sequence of pulses. Each robot may transmit a wireless message and a localization signal concurrently, or synchronously, or otherwise in a way that associates the wireless message with the localization signal. For example, the localization signal may be emitted during the wireless message, such as continuously or periodically during the wireless message, or the localization signal may be emitted upon a particular icon or word or other indicator within the wireless message, or at the beginning or the end of the wireless message. Other robots may receive the localization signal and the identification code concurrently, and may thereby associate the wireless message with the emitting robot. In addition, robots that detect the localization signal and the associated robot identification code may record that association in, for example, computer memory or the like. After localizing a second robot, a first robot can then track the location of the second robot using, for example, cameras. In addition, the first robot can send a wireless communication specifically to the second robot by referring to the second robot's identification code in the wireless message along with an indication that the mentioned identification code is that of the intended recipient. The first robot can also indicate that the wireless message is from the first robot by including the first robot's identification code in the wireless message, along with an indication that the included code identifies the first robot. The first robot can direct a wireless message specifically to the second robot and also show that the message is from the first robot by including the first robot's identification code in the message with an indication that the first robot is the transmitting robot, and by including the second robot's identification code in the message with an indication that the second robot is the intended recipient of the message. With such specificity in communication, the robots can cooperate with each other to perform their tasks more effectively, avoid collisions and mutual interference, and facilitate the operation in many ways.

The electromechanical module may include means for driving and controlling the robot. For example, the driving and controlling means may include motors, batteries, gears, and the like, along with electrical, mechanical, hydraulic, and/or other types of linkages configured to adjust the motor, linkages to apply the brakes, and linkages to control the steering. The electromechanical module may further include means for controlling tools or manipulators attached to the robot, and means for performing whatever tasks the robot is intended for. The electromechanical module may further include indicators and alarms and if necessary transmitting equipment or circuitry and the like to inform a supervisory computer or human of any problems encountered, especially unforeseen hazards and unresolvable problems.

Figure 2:
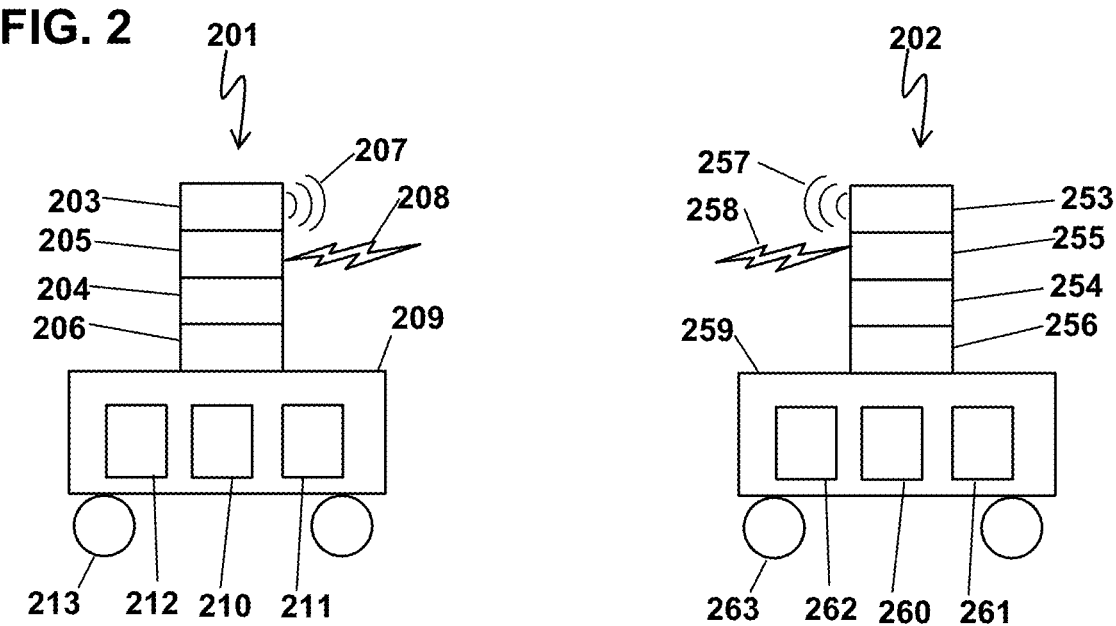
FIG. 2 is a sketch showing two robots configured with exemplary localization systems, according to some embodiments.

FIG. 2 shows schematically two robots performing an exemplary localization procedure. The first robot 201 includes a wireless transmitter 203 transmitting a wireless message 207. The wireless message 207 in this case is a "hailing" message, which is a wireless message that invites other robots to perform a localization procedure. The hailing message, and preferably each wireless message from each robot, may include the identification code of the transmitting robot. The second robot 202 includes a wireless receiver 254 configured to receive the hailing message 207 and other wireless messages. The first robot includes a chassis 209 with wheels 213, a motor 212, a battery 210, a processor 211, a wireless receiver 204, and a localization signal detector 206. The first robot 201 is further equipped with a localization signal emitter 205, which emits a localization signal 208 such as an infrared or visible flash or sound pulse or RF pulse. Typically, the localization signal 208 is emitted simultaneous with, or synchronous with, or otherwise associated with, the wireless message 207 that contains the first robot's identification code. Other robots can then detect the localization signal 208 and thereby determine which robot is associated with that particular identification code, and thereby determine which particular robot is the first robot 201. After localizing each of the other robots, and determining which of the physical robots is associated with which of the identification codes, each robot can thereafter collaborate and cooperate far more effectively to avoid interference and complete their tasks.

In the diagram, the second robot 202 is equipped with a localization signal detector 256 such as an infrared camera, and can thereby localize the first robot 201 spatially, and thereby determine that the first robot 201 is the source of the localization signal 208 by comparing the robots in the image to the direction determined by the localization signal detector 256. Additionally, the second robot 202 includes a wireless receiver 254, and can thereby associate the first robot's identification code with the direction of the first robot 201, and thereby identify (that is, associate the identification code of) and localize (that is, determine the spatial location of) the first robot 201. The second robot 201 further includes a second processor 261, a second battery 260, a second motor 262, a second signal emitter 255, a second wireless transmitter 253, and a second chassis 259 with wheels 263, and emits a second localization signal 258 and a second wireless message 257. Instead of wheels 213-263 the first and second robots 201-202 may have other means for locomotion such as tracks, legs, propellers, etc. Instead of a battery 210-260, the robots 201-202 could have other energy storage means such as hydrocarbon fuel, or they could be solar powered or otherwise powered according to the application and design.

After determining the location of the first robot 201 (by directionally detecting the localization signal 208) and determining the first robot's identification code (by receiving a concurrent wireless message 207), the second robot 202 can then communicate with the first robot 201 with knowledge of the first robot's location relative to the second robot 202. In addition, the second robot 202 can continue to track the first robot 201 optically, using visible light imagers or infrared cameras for example, thereby determining where the first robot 201 is positioned relative to the second robot 202 as long as the first robot 201 remains in view of the imagers. If the second robot 202 loses track of the first robot 201, the second robot 202 can transmit a wireless message to the first robot 201 requesting that the first robot 201 again emit its localization signal. The second robot 202 can include the first robot's identification code in the message so as to specify that the first robot 201 is the intended recipient of the message, and can also include the second robot's identification code in the message with an indication that this is the transmitting robot's code.

In most applications, it is not feasible to determine the direction of a wireless message using a directional antenna, nor to form a directed wireless message using a collimated or focused beam at normal wireless frequencies in the radio band. Directional radiofrequency detection and beam-forming generally require high frequencies and/or large rotatable antennas and/or phased arrays, all of which are expensive and cumbersome. Instead, a robot can send a wireless message specifically to another robot by broadcasting the message omnidirectionally using a very basic antenna, but including the identification code of the intended recipient in the message. Other robots that pick up the message can then determine, from the identification code, that the message is not intended for them, and can ignore it. In some applications, however, it may be feasible to emit a localization signal using high-frequency RF. For example, large earth-moving equipment or an ocean vessel or an airliner, may be large enough to permit sufficiently separated antennas, and the necessary power is also often available. In such cases, each robot may detect the wireless messages directionally, that is, may determine the direction of the transmitting robot by measuring the direction of the incoming wireless message energy. The wireless messages then serve as the localization signals by indicating which vehicle is transmitting each wireless message, in which case a separate localization signal, using a different type of energy, may not be necessary. Developers may select the type and frequency of the localization signal, from the list of pulsed sonic, RF, infrared, and visible energy, or other pulsed energy, according to the application constraints.

Figure 3:
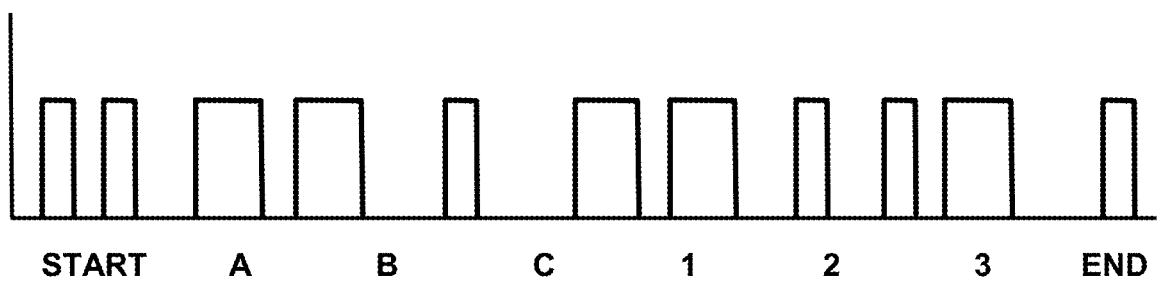
FIG. 3 is a schematic showing exemplary pulses comprising an autonomous robot identification and localization signal, according to some embodiments.

FIG. 3 is a schematic showing an exemplary localization signal that includes the identification code of the emitting robot in the signal. The localization signal includes a plurality of pulses of energy, such as visible or infrared light or sound energy or other energy that can be directionally detected by a receiving robot. Since the identification code is included in the localization signal, it may not be necessary to transmit a concurrent wireless message, thereby reducing congestion in the radio band. The identification code may be embedded or encoded within the localization signal as a series of short and long pulses, or pulses with short and long interpulse intervals, or using frequency modulation, or other modulation configured to convey or indicate the identification code of the emitting robot. The encoding may be in the form of Morse code, or ASCII, or BCD, or straight binary, or one of the many six-bit encodings, or other suitable encoding protocol that includes the symbols or elements of the emitting robot's identification code.

A receiving robot may detect the localization signal code pulses using a high-speed detector which is non-directional, while a different sensor determines the direction of the localization signal without reading the individual pulses. This may be economical since some directional detectors have insufficient time resolution to resolve the individual pulses, while some high-speed detectors lack imaging capability, but the combination of a fast non-directional detector with a slower directional detector may enable the receiving robot to acquire the pulse-coded information and the directional information at the same time.

In the depicted example, the robot identification code is "ABC123". The exemplary coded localization signal also includes a "Start" code, followed by the encoded letters and numbers of the robot's identification code, and terminated by an "End" code. In this notional example, the Start code is two short pulses with a small separation, the End code is a single short pulse after a long space, and the various letters and numbers are indicated by various long and short pulses with long or short interpulse spaces. The pulses may have any duration, but typically are very brief. For example, if the localization signal is optical (visible or infrared) or high-frequency RF, the short pulses may be 1 microsecond long and the long pulses may be 2 microseconds long, and likewise the interpulse periods may be 1 and 2 microsecond respectively. In that case, a localization signal comprising a Start symbol, seven symbols, and an End symbol, may be completed in a very short time such as 50-100 microseconds, depending on the encoding protocol used. In another exemplary system, the signal may be a series of sound or ultrasound energy pulses, in which case the short pulses may be 10 milliseconds in duration and the long pulses may be 20 milliseconds, and the entire localization message may occupy a time of less than 1 second. Use of higher sonic frequencies, such as ultrasonic 100 kHz pulses, may enable shorter pulses such as 1-2 milliseconds and may also simplify the directional determination due to the shorter wavelength of such high frequency sound pulses.

No specific coding is implied by the notional graphic depicted. Many different coding protocols are possible. Preferably, all robots should use the same encoding protocol so that they can interpret other robots' coded localization signals, or at least should be configured to correctly decode the encoded localization signals of the other robots if they use different encoding standards. An advantage of embedding the identification code into the localization signals, rather than in a separate wireless signal, may be to avoid cluttering the radio band with unnecessary wireless messages. If the coded localization signal is garbled or otherwise not decipherable to another robot, or includes corrupt data or signal dropouts, then that other robot can transmit a wireless message requesting that the coded localization signal should be repeated, or alternatively requesting that the code be sent by wireless message instead.

As a further option, the localization signal emitter may be configured to emit coded signals other than robot identification codes. For example, after detecting an imminent collision, a robot may emit a signal encoding "SOS" or "STOP" or other agreed-upon code to warn other robots to keep away. A robot may also use the encoded localization signal to indicate that it is a special robot such as an emergency-response robot or a supervisor robot for example, so that the other robots will know to keep away. The emitting robot may use a distinct frequency or color or other parameter of the localization signal to indicate something about the emitting robot, such as a blue localization signal for supervisor robots, or a low-frequency sonic localization signal for humble laborer robots.

Figure 4:
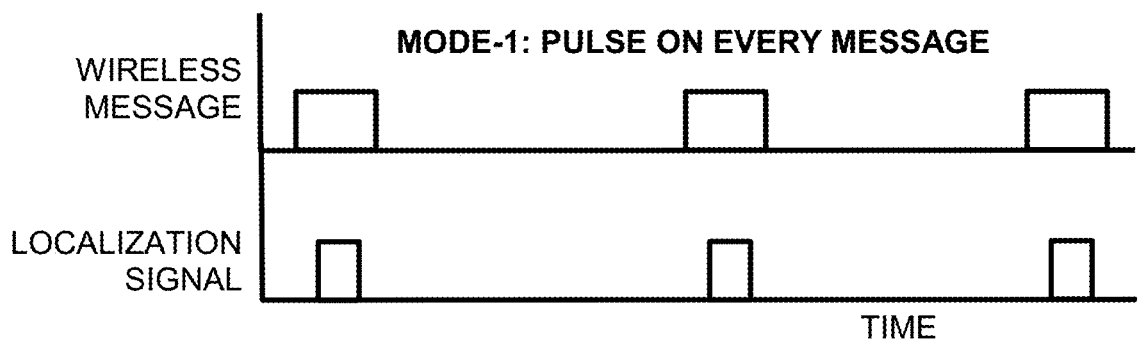
FIG. 4 is a schematic showing an exemplary sequence of wireless messages and localization pulses versus time, according to some embodiments.

FIG. 4 is a schematic showing an exemplary sequence of wireless messages and localization signals versus time. Depicted is a Mode-1 localization procedure in which a non-coded localization signal is emitted synchronously with each wireless message. Accordingly, the schematic shows three wireless messages spaced apart in time, and three localization signals emitted concurrently with the wireless messages. Other robots can receive the wireless messages and can detect the localization signals, and thereby determine which robot is transmitting each wireless signal. In Mode-1, no robot identification codes are required to determine which robot is transmitting, because each message includes a concurrent, or otherwise synchronous, localization signal. Optionally, however, identification codes may be included in Mode-1 wireless messages so that the various robots can then send messages specifically to each other.

Figure 5:
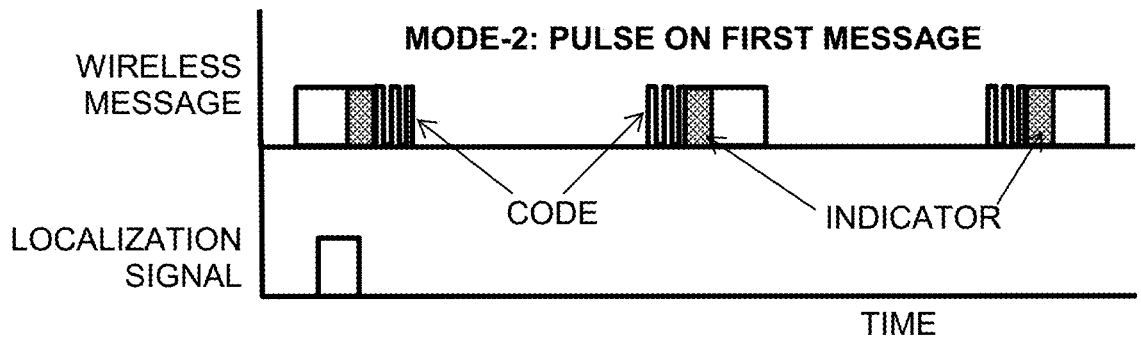
FIG. 5 is a schematic showing another exemplary sequence of wireless messages and localization pulses versus time, according to some embodiments.

FIG. 5 is a schematic showing another exemplary sequence of wireless messages and localization signals versus time. Depicted is a Mode-2 localization procedure in which each wireless message includes the robot identification code ("CODE") of the transmitting robot along with an indicator ("INDICATOR") indicating that the code identifies the transmitting robot, as opposed to a random string, an instruction, or other data. A localization signal is emitted synchronously with the first wireless message, and subsequent wireless messages do not have an associated localization signal. Instead, a receiving robot can determine the location of the transmitting robot upon detecting the first message (according to the direction of the associated localization signal), and can then record the identification code received in that first message and indicated by the indicator in the first message, and thereafter can determine which robot is the source of each subsequent wireless message that includes the same identification code.

The robot identification code may be included in a wireless message at the beginning of the wireless message, or at the end, or elsewhere within the wireless message along with an indicator that indicates that the code is the transmitting robot's identification code. For example, the transmitting robot can send a message that includes passages such as "I am robot number 3.14159. This message is intended for robot 2.71828. Please move one meter north." In that case, the portion "I am robot number" is an indicator indicating that the transmitting robot's identification code follows, and the portion "3.14159" is the identification code. The portion "This message is intended for" is an indicator indicating that the message is specifically intended for another robot, and that the recipient's identification code follows. The portion "robot 2.71828" is the identification code of the intended recipient. Thus a wireless message can mention the identification code of the transmitting robot along with an indicator indicating that the mentioned identification code is that of the transmitting robot, and can also specify the identification code of the recipient robot along with an indicator indicating that the specified code is that of the intended recipient.

Alternatively, the self-identifying code may be placed at a particular place in the message, in which case an explicit indicator may not be needed. For example, by convention, the self-identifying code may be placed at the end of the message (resembling a signature), in which case other robots may be configured to automatically interpret a terminal code in a message as the sender's identification code. Thus the "indicator" is simply the position of the identification code at the end of the message. Likewise, the intended recipient's code may be placed at another particular place in the message, without providing an explicit indicator. For example, the intended recipient's code may be placed at the beginning of the message (resembling a salutation), so that other robots may be configured to interpret a leading identification code in a message as that of the intended recipient. With these conventions, the example message may read as follows: "Robot 2.71828, move north 1 meter. Robot 3.14159." With these conventions, the robots may communicate more easily and with less bandwidth-loading, using shorter messages.

As a further alternative, the transmitting robot can send wireless messages without mentioning its own code; however in that case the receiving robots would have no way to determine which robot the messages are coming from. The receiving robot can then send a wireless hailing message requesting that the transmitting robot again emit a localization pulse.

Figure 6:
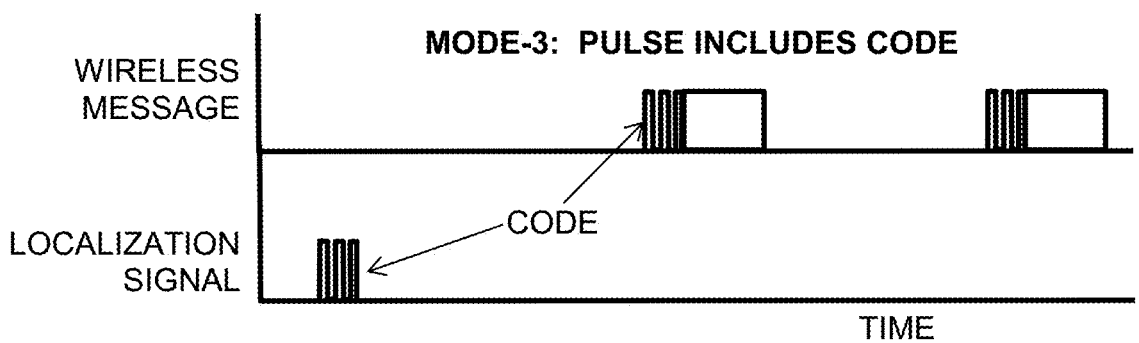
FIG. 6 is a schematic showing another exemplary sequence of wireless messages and localization pulses versus time, according to some embodiments.

FIG. 6 is a schematic showing another exemplary sequence of wireless messages and localization signals versus time. Depicted is a Mode-3 localization procedure in which the transmitting robot's identification code is embedded in a localization signal, for example by modulating a visible or infrared or RF or sonic signal. Other robots can detect the localization signal, and decode the embedded robot identification code, and thereby determine the location of the emitting robot and also record the identification code of the emitting robot. As shown, there is no wireless message associated with the localization signal. Transmitting the identification code in the localization signal, rather than by a separate wireless message, may prevent overloading of the radiofrequency spectrum while efficiently broadcasting each robot's location and identification to other robots. After the initial localization, subsequent communication can be by wireless messages that include the identification codes without further localization signals. However, if a new set of robots arrives in range, the first robot may emit its coded localization signal once again, to introduce itself to the new arrivals.

FIG. 7 is a perspective sketch of an exemplary localization system 700, which may be mounted on a first robot (not shown), and configured to emit and receive localization signals. The localization system 700 may include a localization signal emitter 705 configured to emit a localization signal 708. For example, the localization signal 708 may include one or more pulses of visible or infrared light, and the localization signal emitter 705 may include one or more LEDs or other lamps; alternatively, the localization signal 708 may include sound or ultrasound and the signal emitter 705 may include speakers or sound generators or the like. As a further alternative, the localization signal 708 may include high-frequency RF and the signal emitter 705 may include an antenna array. In some embodiments, the localization signal emitter 705 may extend substantially around 360 degrees and may emit the localization signal 708 substantially all around the subject robot, thereby being visible or detectable to other robots regardless of their azimuthal position relative to the first robot. Such an emitter is "omnidirectional" if the emitted signal energy is distributed throughout all or substantially all horizontal directions (or, in the case of a drone or underwater robot or other robot that travels in three dimensions, the emitted signal energy may be distributed throughout a $4\pi$ solid angle or "isotropically"). A single central emitter 705 may be provided as shown; alternatively, a plurality of emitters may be provided, such as two emitters on the ends of a robot and configured to emit around 180 degrees each, or four emitters on the corners of the robot and configured to emit around 90 degrees, or other combination that, together, covers all or substantially all of a 360-degree range of horizontal angles (or a $4\pi$ solid angle for drones and the like).

The localization system 700 may further include a localization signal detector 706. The detector 706 may be an omnidirectional detector which is configured to detect localization signals from all or substantially all horizontal directions (or all spherical directions for a three-dimensionally mobile robot). Alternatively, the detector 706 may comprise a plurality of separate detectors 715 positioned or aimed around the robot and configured to detect localization signals from all, or substantially all, directions in two (or three) dimensions. In addition, the localization signal detector 706 may be a high-speed optical pulse detector, configured to detect the individual pulses of a pulse-coded localization signal from other robots. The main purpose of the detector 706 may be to detect localization signals with sufficient time resolution to resolve individual pulses and thereby to read the robot identification code which is embedded or encoded or modulated in the localization signal. In some embodiments, the detector 706 may be further configured to determine the direction of the localization signal. For example, the direction-sensitive localization signal detector 706 may include a large number of photodiodes 715 or microphones or antennas, each configured to detect energy in the wavelength of the localization signal, and distributed around the detector 706 with each sensor element 715 being aimed or focused or collimated in a different direction. Alternatively, the sensor elements 715 may be an array such as a sonic receiver array or a high-frequency RF antenna array for example. The detector 706 may thereby detect localization signals substantially all around the horizontal plane (or around the $4\pi$ sphere), and also may indicate the direction of the emitting robot according to which of the sensors 715 registered the detection. Photodiodes sensitive to visible and/or infrared light with sub-microsecond time resolution are readily available, as are microphones sensitive to sound and ultrasound at high frequencies.

The localization system 700 may further include an imaging device 718, which may have lenses 714 pointing in various directions, configured to form images of robots and other items around the first robot. Thus, the imaging device 718 may detect the various robots and their locations or directions, while the directional detector 706 may detect the incoming localization signal and its direction according to which sensor 715 was activated. Thus, the localization system 700 can determine which robot emitted the localization signal. In addition, by correlating the image with the code that was observed by the detector 706, the emitting robot's identification code can be correlated with the physical robot that was recorded in the image. Concordance of the localization signal with one of the imaged robots can thereby determine both the identification code and the spatial location of that emitting robot.

To consider a specific example, the localization signal 708 may comprise a plurality of brief pulses in which the emitting robot's identification code is embedded. The localization signal emitter 705 may include a sufficient number of infrared LEDs pointing around the subject robot to cover substantially all horizontal directions. The localization signal detector 706 may include a sufficient number of infrared-sensitive photodiodes or phototransistors or other suitable sensor elements 715, distributed around the periphery and pointed in various directions to detect localization signals coming from substantially any direction around the first robot. Each sensor element 715 may be configured to have sufficient time resolution and sensitivity to resolve individual pulses of the incoming coded localization signals. The imager 718 may be a visible-light camera or a near-infrared camera or other suitable imaging device, configured to image robots around the first robot and determine the spatial locations of those robots.

As an alternative, the localization signal emitter 705 may have a single infrared source along with a conical reflector or other optical elements configured to distribute the localization signal 708 horizontally around the first robot. Other suitable optical arrangements are also known.

FIG. 8 is a perspective sketch of another exemplary localization system 800. In this example, the robot identification code is again embedded in the localization signal. However, the localization signal detector is not directional; instead it is configured to read the incoming identification codes omnidirectionally. At the same time, an imager such as a camera is sensitive to the localization signal and also to the various robots in view of the imager. The imager thereby images both the localization signal flash and the robots in a single image, and thereby identifies the emitting robot as the one with the flash upon it.

More specifically, the localization system 800 may include an omnidirectional emitter 805 configured to emit a localization signal 808 that includes an identification code therein. In addition, a high-speed omnidirectional detector 806 may be configured to detect other robots' localization signals and to read the codes therein, such as measuring the width and timing of a series of pulses that form the incoming localization signals. Thus, the detector 806 may read the code but, since it is omnidirectional, the detector 806 does not determine which robot emitted the code, in this example. Concurrently, an imager 818 such as a camera with lenses 814 may be configured to record the robots and the localization signal on the same image. The localization signal may appear as a flash superposed on one of the robots. For example, the imager 818 may be a camera sensitive to both visible and infrared light. Thus, the imager 818 may determine which particular robot emitted the localization signal, while the detector 806 reads the code. Thus, the emitting robot's location and code are both determined. Imaging devices typically record a scene in frames by accumulating light or other energy during a predetermined brief interval. In that case, the incoming localization signal (which may be very brief) may appear in only a single frame, such as the frame which was acquired when the fast localization signal was detected by the detector 806. By seeking the location of a single-frame transient feature synchronous with the detected localization signal, the system 800 can thereby determine which robot emitted the localization signal.

FIG. 9 is a perspective sketch of an exemplary localization system configured to image robots and other items, and simultaneously to image an incoming non-coded localization signal, using two separate imaging devices. The system 900 includes a localization signal emitter 905 emitting a localization signal 908 such as an infrared flash. In this embodiment, the localization signal 908 is pulsed but is not encoded; instead, the identification code is provided separately by a concurrent wireless message.

The system 900 further includes two imaging devices: a localization signal imaging device 906 such as an infrared camera, and a general scene imaging device 908 such as a visible-light camera. The localization signal imaging device 906 may be configured with lenses 914 or other directional items, and configured to detect and image localization signals from other robots. The scene imaging device 908 may be configured with further lenses 924 to image around the first robot to detect the direction or location of other robots, and specifically to observe whichever robot is emitting the localization signal that the localization signal imaging device 906 has detected. By correlating the visible and infrared images, the depicted system 900 may localize the emitting robot spatially, and by correlating that robot with a robot identification code (provided in a concurrent or synchronous wireless message) the emitting robot can be associated with the identification code. In addition, the system 900 may track the emitting robot using, for example, the scene imaging device 918, and the system 900 may maintain and update the direction or positional information about the identified robot as it moves.

FIG. 10 is a perspective sketch of another exemplary localization system 1000 in which the localization signal includes sound pulses. An imaging device 1018 such as a camera is configured with lenses 1014 to view around the first robot and thereby to detect other robots. The localization signal in this case is a single brief pulse of ultrasound emitted by a sonic antenna including three linear sonic antenna elements 1005. To emit a sonic localization pulse, the three sonic antenna elements 1005 are driven in-phase at a frequency, such as 50 kHz or 100 kHz, and thereby emit sound waves substantially horizontally around the first robot. To detect sonic localization pulses from other robots, the three antenna elements 1005 are configured to convert incoming sound waves to electrical signals, which are then amplified separately and compared to each other, so as to determine the relative arrival times of the sound waves at each of the sonic antenna elements 1005. The relative timing of the waves at the three sonic antenna elements 1005 indicates the azimuthal direction of the emitting robot in two dimensions, relative to the first robot. Then, comparison of that azimuthal direction with an image from the imaging device 1018 thereby localizes the emitting robot and associates it with the identification code in the concurrent wireless message using the transceiver 1003.

Figure 11:
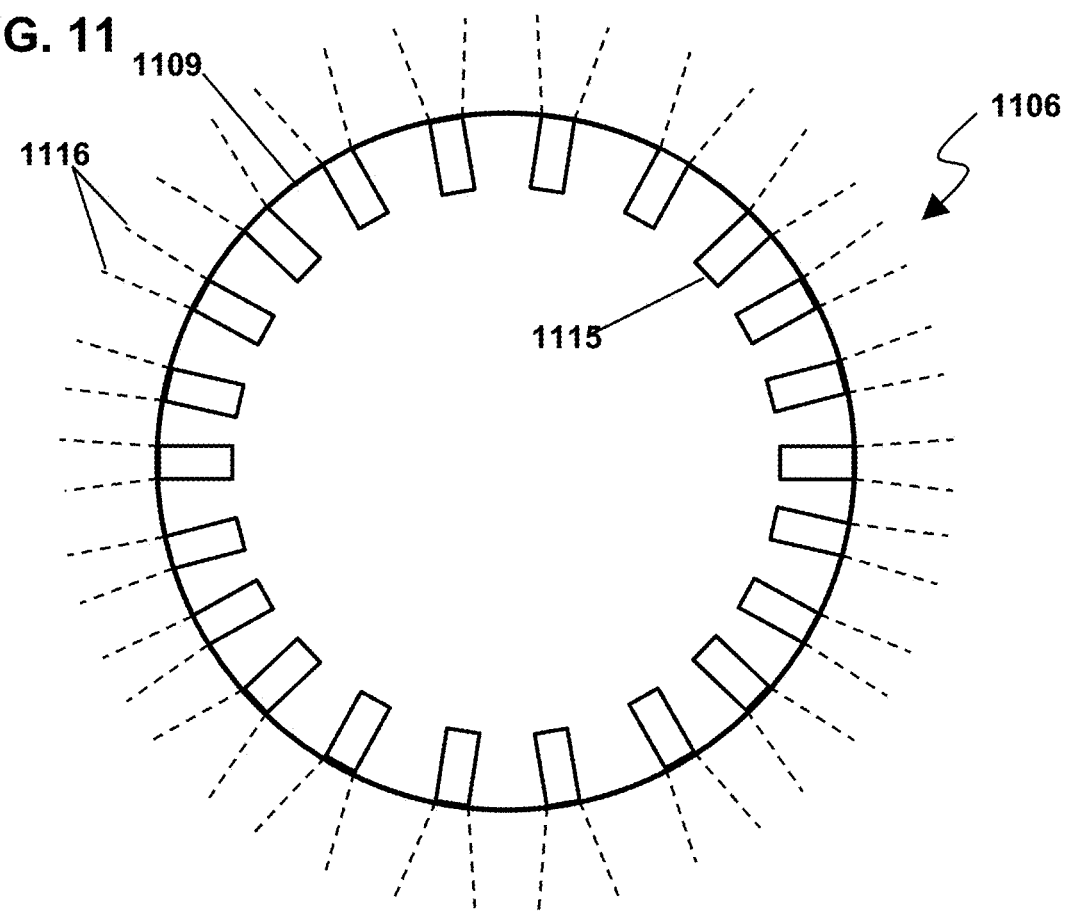
FIG. 11 is a top-view cross-section sketch showing the distribution of localization signal detector elements arranged around a circular enclosure, according to some embodiments.

FIG. 11 is a notional top-view cross-section sketch of an exemplary directional detector 1106 for detecting localization signals and determining their directions. The depicted system 1106 comprises a large number of sensor components 1115 mounted on a circular frame 1109 and aimed at different horizontal directions and configured to detect the wavelength and timing of localization signal pulses. Each sensor component 1115 has a limited field of view indicated by dashed lines 1116, so that an arriving localization signal is observable in only one of the sensor components 1115 (or perhaps divided between two adjacent sensor components 1115). The direction of the emitting robot is thus determined by which of the sensor components 1115 detected the localization signal, and if two adjacent sensor components 1115 detected the same localization signal, the direction of the robot may be determined by averaging, interpolation including weighted interpolation, or other combination of the two detected sensor components 1115.

Figure 12:
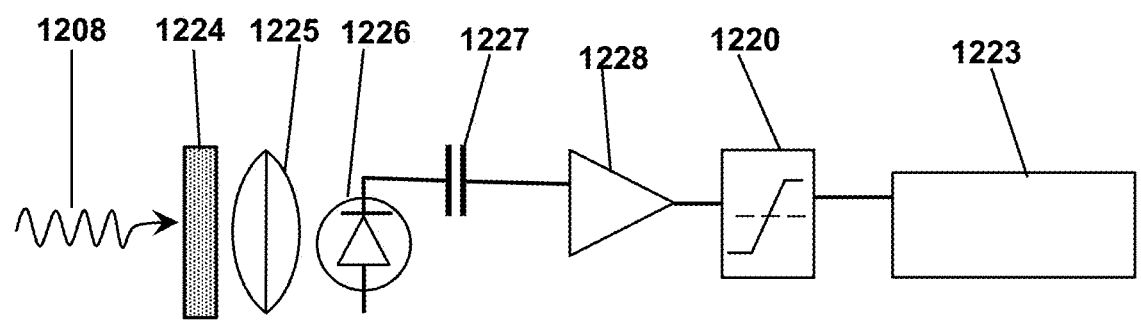
FIG. 12 is a notional schematic of a circuit for detecting pulse-coded localization signals, according to some embodiments.

FIG. 12 is a notional circuit schematic of one of the sensor components 1115 of FIG. 11. A localization signal symbolized as an electromagnetic wave 1208 is incident on an optical filter 1224 configured to pass wavelengths that include the localization signal 1208, which in this case is optical. A lens 1225 focuses the energy onto a biased photodiode 1226, causing a current flow that transits through a high-pass or other electronic filter 1227 which may be configured to admit frequencies corresponding to the pulses of a coded or non-coded localization signal while blocking other frequencies such as noise and backgrounds. Then a gain stage, such as an operational amplifier 1228, amplifies the rapid signal, and a voltage discriminator 1220 or the like can sharpen the shape and timing of the detected pulses. A processor such as a microcontroller 1223 can then record the pulse or pulses, and can indicate that the localization signal 1208 has been detected. Also, if the localization signal 1208 includes an embedded robot code, the microcontroller 1223 may be configured to decode it.

Figure 13:
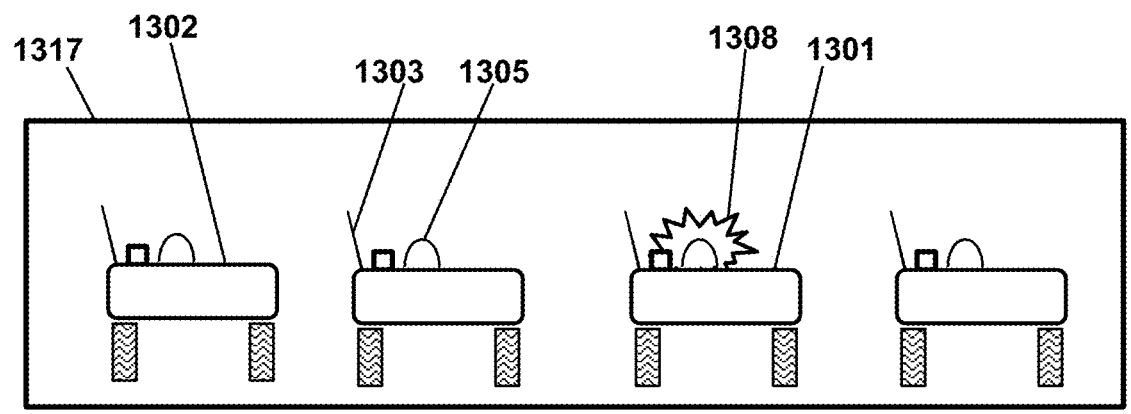
FIG. 13 is a sketch showing an exemplary image that includes several mobile robots and a localization signal, according to some embodiments.

FIG. 13 is a notional sketch of an exemplary image 1317 obtained by an imaging device such as a camera, configured to record both a localization signal and the emitting robot in the same image. In the image 1317, four robots 1302 are seen, each with a localization signal emitter 1305 and a wireless transceiver 1303. One of the robots 1301 is emitting a localization signal 1308 which appears along with the emitting robot 1301 in the image 1317. The imaging device thus determines which of the robots is emitting the localization signal 1308. Also, if a robot identification code is provided in a concurrent wireless message or encoded in the localization signal 1308, then the robot identification code can be associated with the particular robot 1301 that emitted the localization signal 1308.

Figure 14:
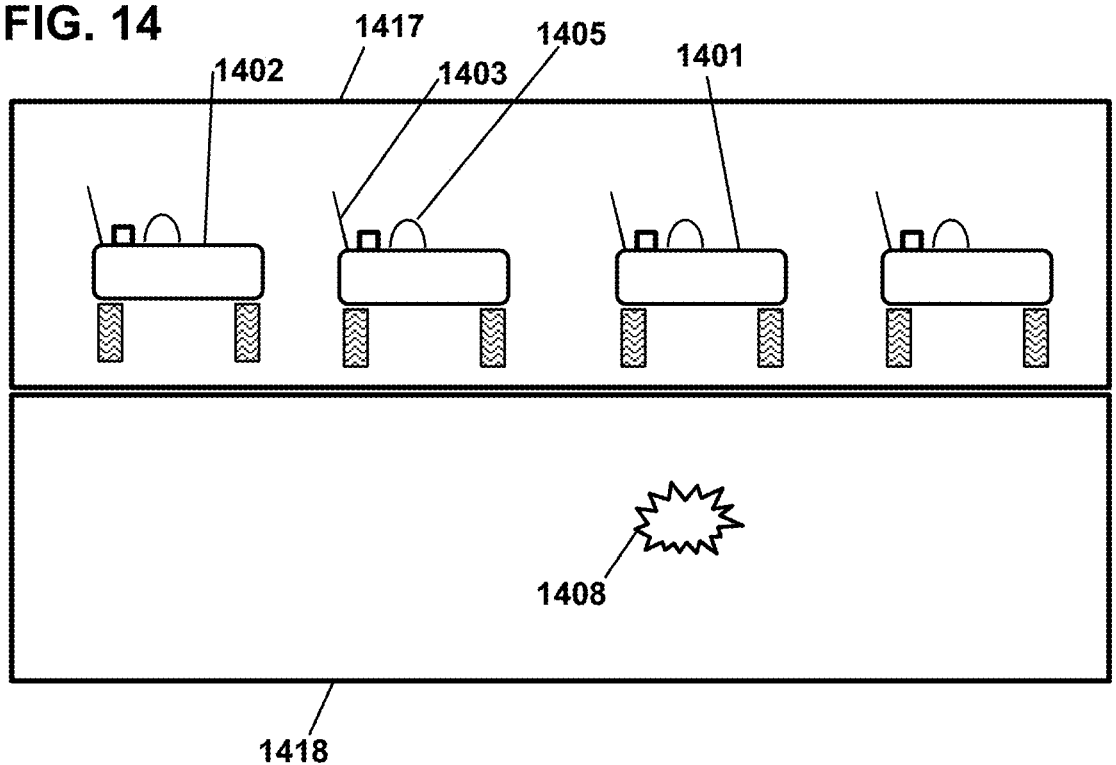
FIG. 14 is a sketch showing two exemplary images, one in visible light and the other in infrared, according to some embodiments.

FIG. 14 is a notional sketch of two exemplary images 1417-1418. The first image 1417 is a visible-light image showing four robots 1402, each of which includes a localization signal emitter 1405 and a wireless transceiver 1403. A particular robot 1401 is emitting a localization pulse in the infrared, but this does not show up on the first image 1417 which only shows visible light. The second image 1418 is an infrared image showing the localization signal 1408, but does not show the robots 1401-1402. When combined, the two images 1417-1418 thereby indicate which robot is the emitting robot.

FIG. 15A is a schematic showing how a collision scenario may proceed according to prior art, in which the robots do not have localization systems such as those disclosed herein. The robots therefore have no way to identify and localize the other robots. Consequently, little or no cooperation can be arranged, even in an emergency. The depicted scenario involves successive views of three robots at successive times. The scenario ends in a needless collision.

At time t=0, in a passageway demarked by lines 1530, there are shown three icons representing a first, second, and third robot 1501-1503. A block arrow such as 1516 indicates how each robot is moving.

The passageway is repeated at a later time t=T1 such as 1 second. Thus, the figure shows how each robot moves during the scenario.

Initially, at t=0, the first robot 1501 is approaching from the left and the two other robots 1502 and 1503 are approaching from the right. There is not enough space between the two robots 1502-1503, nor on either side, for the first robot 1501 to pass. Therefore, the first robot 1501 sends wireless messages to the other robots suggesting that one of them should shift to the right and the other one should shift to the left to avoid a collision. However, since the robots lack a system for localizing each other, the first robot 1501 has no way to specify which of the other two robots 1502-1503 should move left or right. Consequently, at t=T1, the second robot 1502 has mistakenly assumed that it was supposed to shift left, and the third robot 1503 has mistakenly shifted right, resulting in a three-robot collision, or at least an unnecessary blockage and mutual interference among the robots.

Figure 15B:
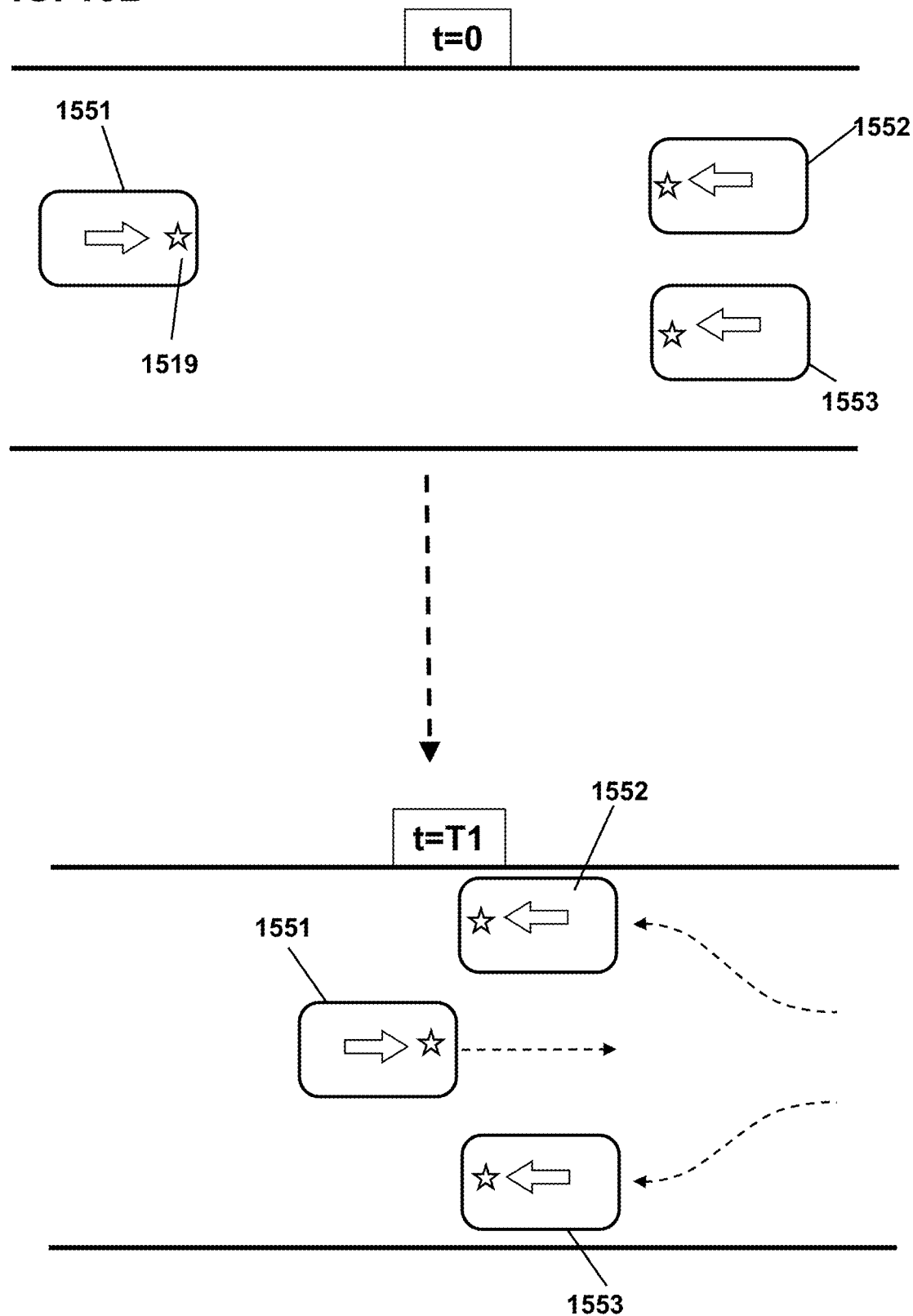
FIG. 15B is a sketch showing sequential positions of three robots having exemplary localization systems, at successive times, in which a collision is avoided.

FIG. 15B shows a similar scenario, but now the robots include localization systems according to the present disclosure. By cooperating, they manage to avoid the collisions.

The first, second, and third robots 1551-1553 now include localization systems 1519, indicated by a star, and therefore can determine the identification codes of each other robot specifically, and can send wireless messages to each other specifically. Accordingly, the first robot 1551, after first exchanging localization signals and identification codes with the other robots 1552-1553, then sends a wireless message specifically to the second robot 1552 suggesting that it shift to its right, and another wireless message specifically to the third robot 1553 suggesting that it shift to its left. At the time t=T1, the second and third robots 1552-1553 have moved as shown by dotted arrows, thereby opening space between them for the first robot 1551 to pass by. In this way, the robots 1551-1553 have used their localization systems 1519 to avoid an unnecessary collision and removed a temporary blockage peacefully. Most interference situations among autonomous mobile devices may be resolved faster and better, or avoided altogether, by communicating with knowledge of which device is where.

Figure 16A:
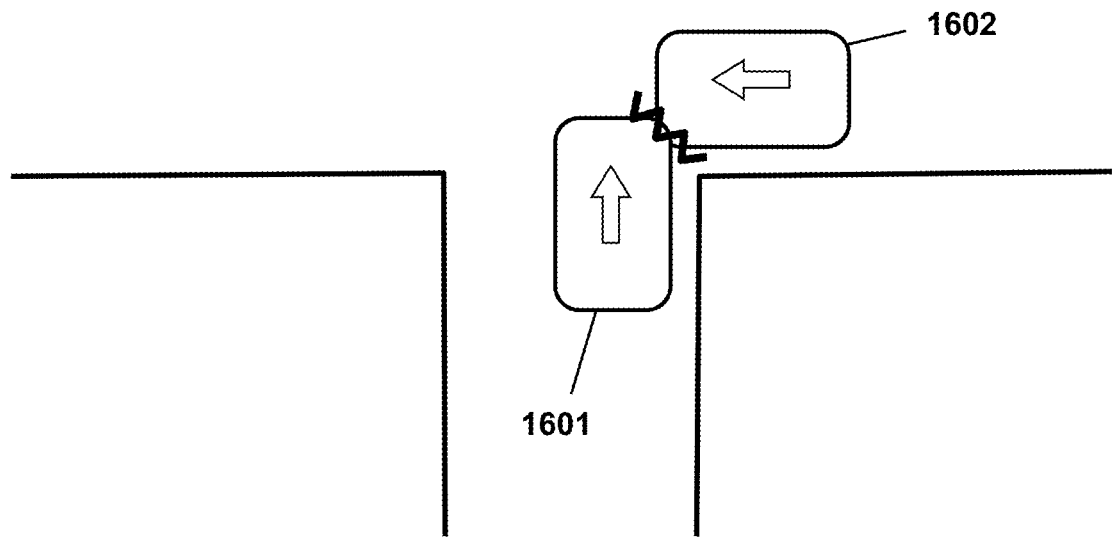
FIG. 16A is a sketch showing two prior-art robots in collision at an intersection.

FIG. 16A is a sketch showing how robots lacking a localization system can collide in an intersection defined by opaque walls. The first and second robots 1601-1602 approach the intersection and, since they cannot specifically communicate with each other, are unable to stop in time to avoid a collision.

Figure 16B:
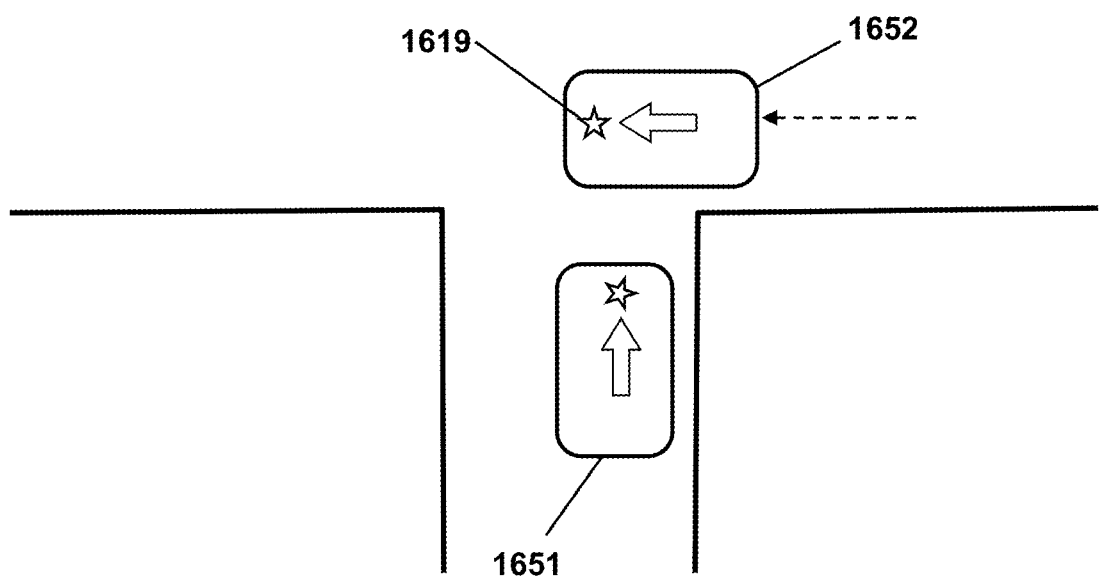
FIG. 16B is a sketch showing two exemplary robots with localization systems avoiding a collision at an intersection.

FIG. 16B is a sketch showing how robots 1651-1652 that include exemplary localization systems 1619 can avoid such a collision. The two robots 1651-1652 are still unable to see each other using their imagers due to the walls, but since they have previously determined each other's identification codes, they can communicate specifically to each other. For example, the first robot 1651 knows that the intersection is dangerous due to poor visibility, and therefore may send a wireless message to any robots in proximity stating that it is approaching the intersection. The second robot 1652 receives the message and, since it is also approaching the intersection, may deduce that a collision may be imminent. Therefore, the second robot 1652 may send a wireless message specifically to the first robot 1651, requesting that it hold back until the second robot 1652 passes. The first robot 1651 obligingly holds short of the intersection until the second robot 1652 has passed, and then proceeds. In this way the robots 1651-1652 have avoided an unnecessary collision.

Figure 17:
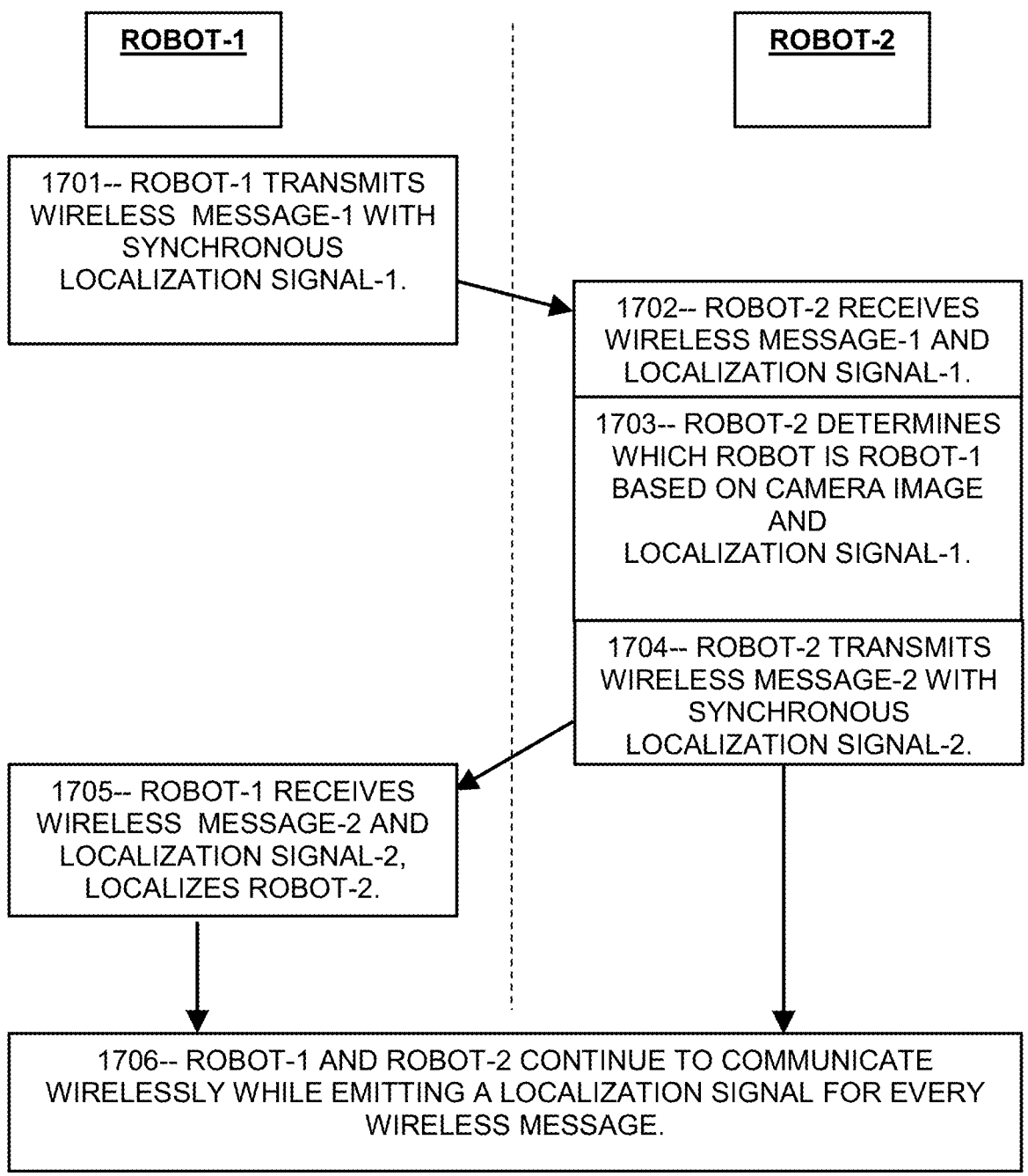
FIG. 17 is a flowchart showing an exemplary method for two robots to exchange messages synchronized with localization pulses, according to some embodiments.

FIG. 17 is a flowchart showing an exemplary localization procedure in which each robot emits a localization signal synchronously with each wireless message (termed Mode-1 above). Robot identification codes are not included in this example, although the robots may have identification codes and may exchange them aside from the actions shown here. The actions of robot-1 are shown on the left and robot-2 on the right.

In the depicted example, robot-1 transmits (1701) a first wireless message and, at the same time or otherwise synchronously, emits a first localization signal such as a visible or infrared pulse. Robot-2 receives (1702) the first wireless message and the first localization signal, and determines (1703) which robot, of several proximate robots, is the robot-1, based on a camera image that shows the first localization signal while the first wireless message was received. Robot-2 transmits (1704) a second wireless message synchronously with a second localization signal. These are received (1705) by the robot-1, which thereby localizes robot-2. The robots may continue to communicate wirelessly (1706), while continuing to emit localization signals synchronously with each wireless message, thereby indicating which robot is associated with each wireless message. If the other proximate robots transmit wireless messages, they may emit synchronous localization signals in the same way, thereby avoiding any confusion as to which robot is transmitting each message.

Figure 18:
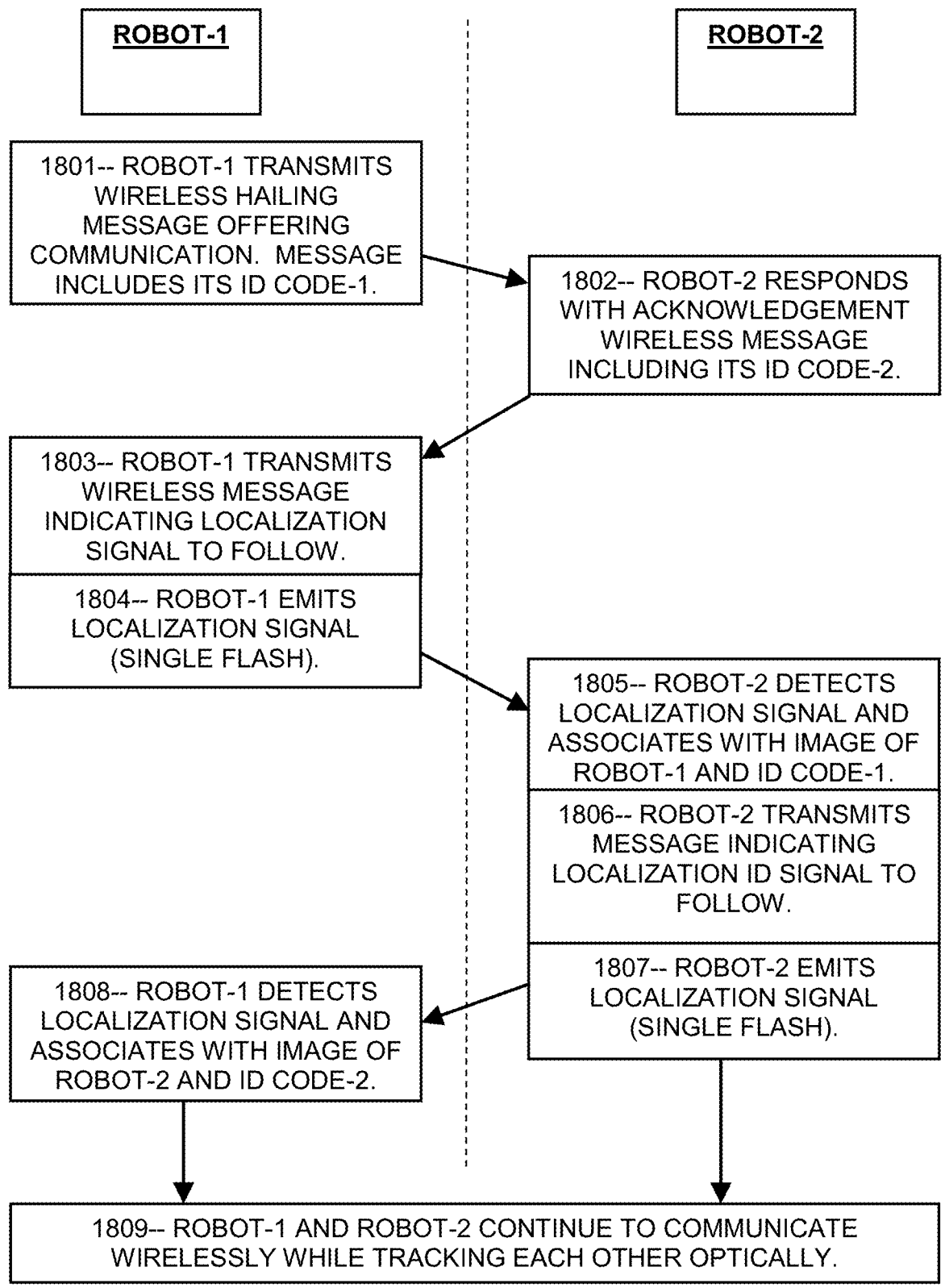
FIG. 18 is a flowchart showing an exemplary method for two robots to spatially localize each other, according to some embodiments.

FIG. 18 is a flowchart showing an exemplary Mode-2 localization procedure in which multiple wireless messages are exchanged in preparation for the localization signal. The actions of robot-1 are shown on the left and robot-2 on the right. Robot-1 initiates (1801) the localization procedure by "hailing" other robots, that is, by transmitting a wireless message that identifies robot-1 as an autonomous robot and requests a mutual localization procedure with any robots in range. Each robot-1 message includes robot-1's unique identification code ("code-1" in this example). Robot-2 responds (1802) with a wireless message indicating that it too is autonomous, and in the same message provides its identification code-2. Robot-1 sends (1803) another wireless message indicating that it is about to emit a localization signal, and emits (1804) a non-coded localization signal, such as a single ultrasound or infrared pulse. Since the robot identification code was provided in a wireless message, it is not necessary to embed the identification code-1 in the localization signal. Also, the localization signal is synchronized with a robot-1 message, thereby associating the code-1 with robot-1. Robot-2 detects (1805) robot-1's localization signal using, for example, a directional detector or an array of detectors or an imaging device sensitive to the type of energy in the localization signal, such as an infrared-sensitive camera for an infrared pulse or an array of microphones for a sonic localization signal, thereby localizing robot-1 and associating it with code-1.

Robot-2 transmits (1806) a wireless message indicating that its localization signal is forthcoming, along with its identification code-2. Robot-2 emits (1807) a localization signal such as another infrared pulse. Robot-1 detects (1808) robot-2's localization signal, using an infrared camera or microphone array for example, thereby localizing robot-2 spatially and associating robot-2 with identification code-2. Thereafter, robot-1 and robot-2 can continue to communicate (1809) while spatially tracking each using, for example, cameras and image analysis, or by radar, or other suitable means for following the positions of robots. The robots can thereby cooperate with each other using the knowledge of where each of the robots is located. With such cooperation, collisions can be avoided and autonomous tasks can be facilitated generally.

Figure 19:
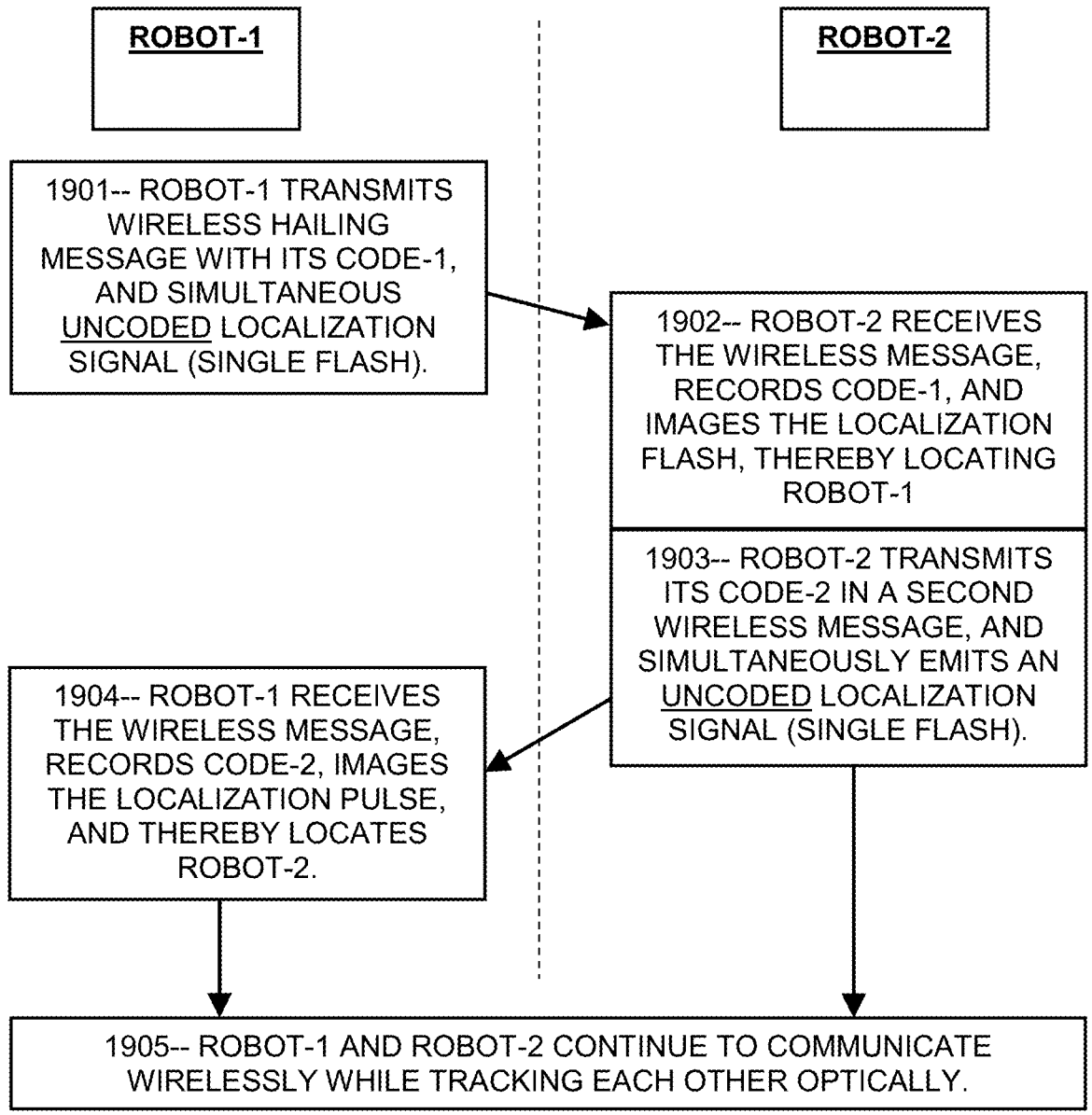
FIG. 19 is a flowchart showing an alternative exemplary method for two robots to spatially localize each other, according to some embodiments.

FIG. 19 is a flowchart showing a simpler exemplary localization procedure, in which the robot identification code is provided in a single wireless message instead of back-and-forth handshaking. Robot-1 transmits (1901) a wireless hailing message that includes its identification code-1, and simultaneously emits a non-coded localization signal such as a single infrared pulse. Robot-2 receives (1902) the wireless message and images the localization signal using, for example, an infrared camera. Robot-2 records the code-1 and the position of robot-1, thereby localizing robot-1. Robot-2 transmits (1903) a wireless message with its code-2 and simultaneously emits a non-coded localization signal such as an infrared pulse. Robot-1 receives (1904) the wireless message and the localization pulse from robot-2, thereby localizing it. The two robots can collaborate (1905) with knowledge of their relative positions.

Figure 20:
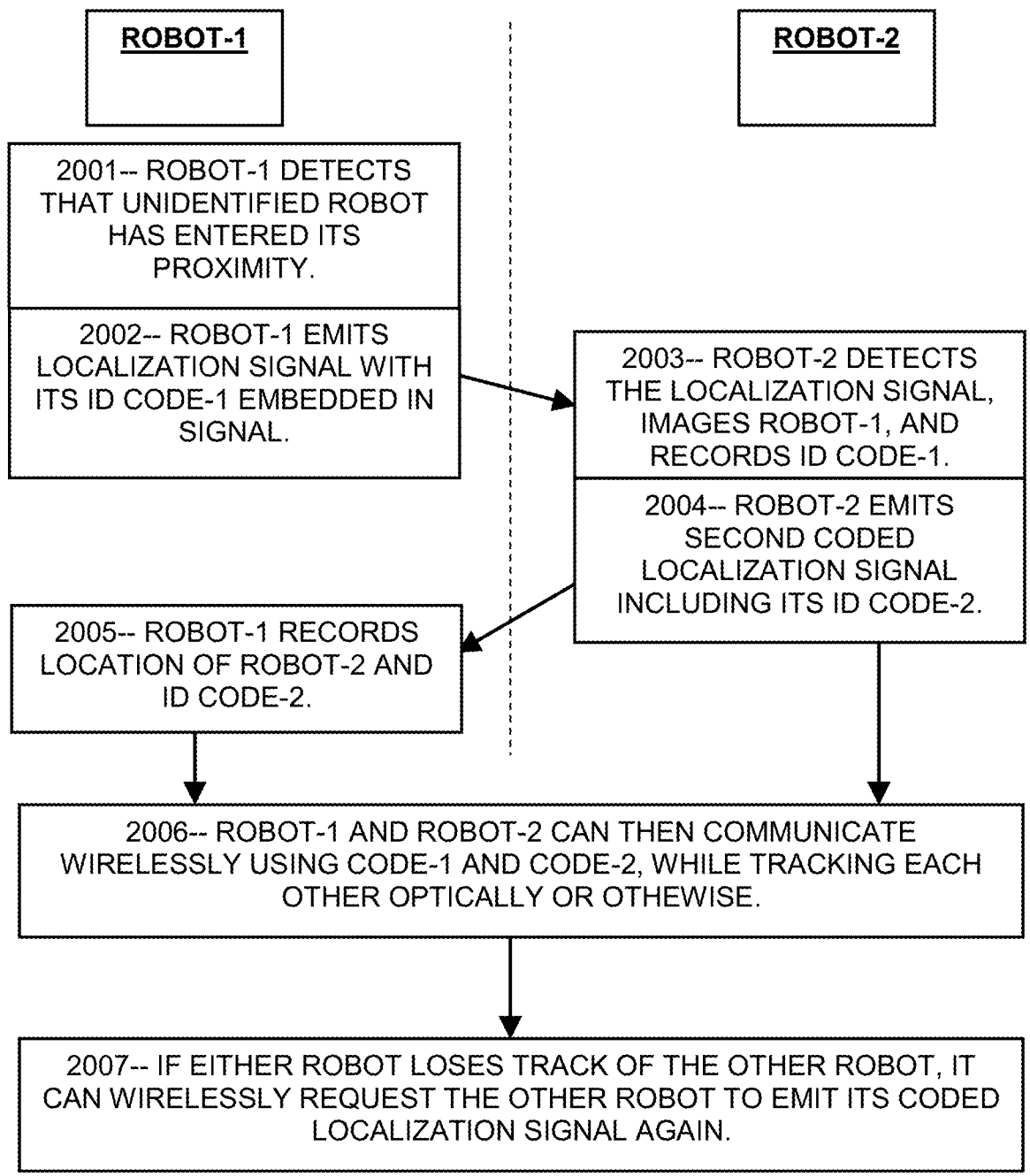
FIG. 20 is a flowchart showing another alternative exemplary method for two robots to spatially localize each other, according to some embodiments.

FIG. 20 is a flowchart showing another exemplary localization procedure, in which the identification code is embedded in the localization signal rather than a wireless message (Mode-3). Robot-1 detects (2001) that an unidentified robot-2 has entered its proximity and emits (2002) a coded localization signal, such as a series of infrared pulses with its identification code-1 embedded therein. Robot-2 detects (2003) the localization signal, and images robot-1 along with the localization signal, thereby determining the location of robot-1 as well as its identification code-1. Robot-2 emits (2004) a coded localization signal that includes its identification code-2, and robot-1 receives (2005) that signal while imaging robot-2, thereby localizing robot-2 in association with its identification code-2. With that knowledge, the robots can communicate wirelessly (2006) using the known identification code-1 and code-2, while continuously tracking the other robot by optical imaging, or radar, or other suitable tracking means. Either robot can request (2007) another localization signal wirelessly if the tracking is interrupted. An advantage of this version may be that it avoids cluttering the radio bandwidth with unnecessary wireless messages, since no wireless messages are involved until one of the robots has a need for communication. Another advantage may be that the range is self-limiting, in that any pair of robots that cannot see the other robot's localization signal would be considered out of range.

The localization procedure may be configured to avoid signal contention or overlap, a situation in which two robots attempt to transmit wireless messages or localization signals at the same time. For example, signal contention can occur if robot-1 transmits a hailing message and two other robots respond at the same time. To avoid such interference, each robot may be configured to wait for a random or pseudo-random waiting interval after receiving the hailing message, and then to respond if no other robot has responded sooner. (Random and pseudo-random are treated as equivalent herein.) In that way, message overlap is largely prevented. If a robot is prepared to respond to the hailing message, but is forced to withhold its response due to interference, then the withholding robot may wait until the in-progress localization procedure has concluded, and may then respond. In addition, to avoid creating a second contention situation, the withholding robot may provide a second random-duration waiting period. For example, after detecting that the in-progress localization procedure has concluded, the withholding robot may then wait an additional random interval, and then may initiate its response if a third robot has not already done so. Thus, the randomized waiting intervals can avoid cascaded contention and interference.

The random or pseudorandom waiting intervals may be arranged according to a random-number algorithm executed by a processor, such as a calculation that selects a number of milliseconds of waiting time, or otherwise. The algorithm that provides the random interval may be configured to populate the random intervals uniformly within a predetermined range of waiting times, such as between 1 second and 2 seconds. Such a predetermined interval, during which an event can be triggered, is sometimes called a "gate". Thus a first robot may be configured to receive a wireless message from a second robot, and then to wait for a predetermined waiting interval to avoid post-message signal contention with other robots, and then to prepare a gate interval of a predetermined length, and to select a random time within that gate interval to emit its responsive second wireless message.

The robots may be configured to adjust their random waiting intervals according to various conditions. For example, if a robot has been forced to withhold its response to a hailing message, that robot may then shorten its random waiting interval on the next try, thereby increasing the likelihood that it can beat the other robots. Each robot may be configured to initially start with a rather long waiting interval such as between 500 and 1000 milliseconds, on the first attempt. Then, if the robot is prevented from responding due to other messages starting first, the withholding robot may shorten the next random waiting interval to between 250 and 500 milliseconds. After each successive inhibition, the robot may halve its range of random waiting intervals, and continue likewise until the withholding robot is finally able to initiate communication without interference. In this way, each robot is likely to have a turn, and the robots that have waited longest automatically become the first in line for the next attempt. After finally completing a full localization procedure, each robot may restore its random waiting range back to the initial long setting, so that other waiting robots can then have their turn.

The robots may be configured to complete the full localization procedure in a short time, such as 0.1 or 1 or 10 or 100 milliseconds using, for example, fast electronic and optical or ultrasound components. In most situations, even if dozens or hundreds of other robots are in range, most or all of the robots within range may then be able to complete their localization procedures in 1 second or a few seconds, typically. In addition, if each robot is configured to embed its identification code in the localization signal rather than in wireless messages, the period of contention may be extremely short, such as only 50-100 microseconds in some embodiments, by emitting a correspondingly brief localization signal.

Figure 21:
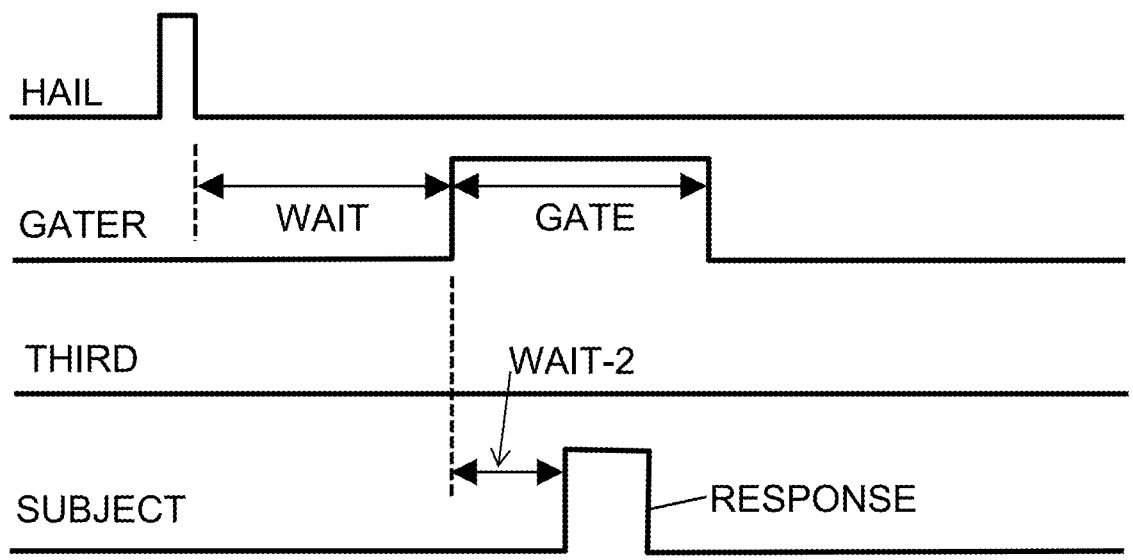
FIG. 21 is a schematic sketch showing time traces such as oscilloscope traces for various steps of an exemplary localization process, according to some embodiments.

FIG. 21 is a schematic chart showing the timing of various actions pertaining to a first robot's response to another robot's hailing message. The horizontal axis is time, and each line or item represents an action or a demarked time interval. In the first line, the first robot transmits a hailing message during a time indicated by the pulse marked HAIL. The line marked GATER represents an electronic clock in the first robot that is configured to wait, after the end of the hailing message, for a predetermined time interval WAIT, and then to open a gate interval GATE during which the first robot can respond to the hailing message if no interference is present. A third robot is present as indicated by the line THIRD; however, the third robot remains silent in this case; hence the line marked THIRD is flat. The first robot then responds to the hailing message at a random (or pseudo-random or otherwise computed) moment within GATE. In summary, the first robot avoids interference with other robots by waiting for the predetermined WAIT interval, thereby giving other robots a chance to respond. In addition, the first robot may wait a second random interval after the GATE has opened, to avoid pile-up that could occur if multiple robots all initiated messages at the end of the predetermined WAIT interval. The second interval is marked WAIT-2.

Figure 22:
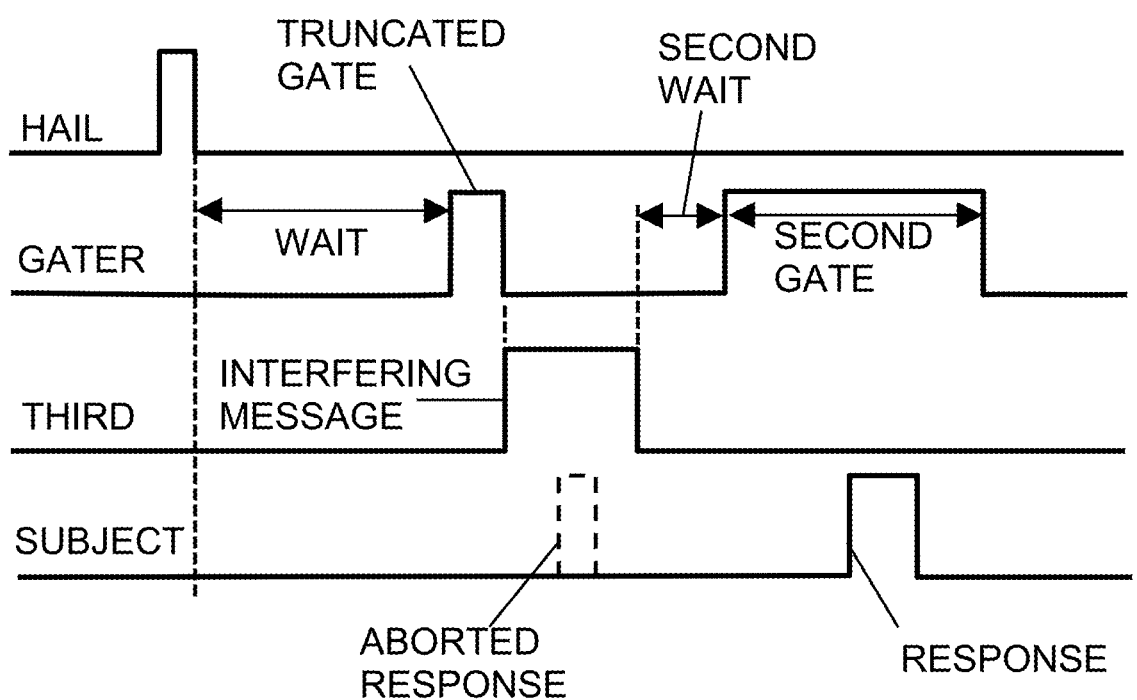
FIG. 22 is a schematic sketch showing time traces such as oscilloscope traces for various steps of an exemplary localization process with interference, according to some embodiments.

FIG. 22 is a similar schematic, but this time the third robot begins transmitting before the subject robot does, and therefore the first robot has to abort its response and wait until the intruding robot finishes. The HAIL message is shown in the first line. The first robot's timing is shown in the second line GATER, starting with the predetermined WAIT interval and then opening a gate. However, in this example, the third robot begins transmitting a message while the first robot's gate is open but before the first robot has started transmitting. Therefore, the first robot, detecting the interference, immediately closes its gate interval, which is labeled as TRUNCATED GATE for that reason.

After the interfering message has completed, the first robot then prepares another predetermined delay labeled SECOND WAIT. Since the first robot was forced to withhold its message, the SECOND WAIT interval is chosen to be shorter than the original WAIT interval. The first robot then opens another gate interval labeled SECOND GATE, during which a response may be transmitted at some random moment. The last line shows, in dash, the originally planned response message labeled ABORTED RESPONSE, which was aborted due to the interference. The final message, labeled RESPONSE, was then transmitted within the SECOND GATE. The SECOND WAIT interval is configured to be shorter than the original WAIT interval so that the first robot would have an increased likelihood of being able to start its RESPONSE before another robot begins transmitting. Thus the first robot is configured to wait, after receiving the hailing message, for a first waiting interval before arranging its gate interval, but in this case the first robot has detected the third wireless message, and therefore has prepared a second waiting interval to ensure that the intruding message had finished, followed by a gate interval in which the first robot may finally transmit its message at a randomly-selected time. The first robot initially started with a relatively long WAIT interval so that other robots could have a chance, particularly those other robots that were previously forced to withhold their responses. The first robot then prepared successively shorter wait intervals after each aborted response, to increase the likelihood that it will be able to transmit. The intent of the successively shorter wait intervals is to give the first robot an advantage relative to other robots that have not had to withhold their messages, but not to gain advantage relative to the robots that have already withheld their messages longer than the first robot. If all the robots adopt the same standards for the waiting and gating intervals, the method provides that each robot will get a turn, with those waiting the longest getting successively higher priority in timing.

In some embodiments, the initial hailing message may contain information that would allow other robots to filter their response. It may not make sense to try to localize certain other robots, or even to attempt communication with them. For example, the hailing message may include the hailing robot's identification code, so that other robots that have already localized that hailing robot can ignore the message. For example, "Hail, other robots! I'm ABC123. Please respond if you have not already done so." Other robots that have already localized ABC123 could then ignore the message.

In a similar way, the hailing message may contain information about the general location of the hailing robot, such as "I'm at GPS coordinates 1.234×5.678. Respond if you are near." Then other robots receiving the message may ignore it if they are sufficiently far away that interference is unlikely.

Figure 23:
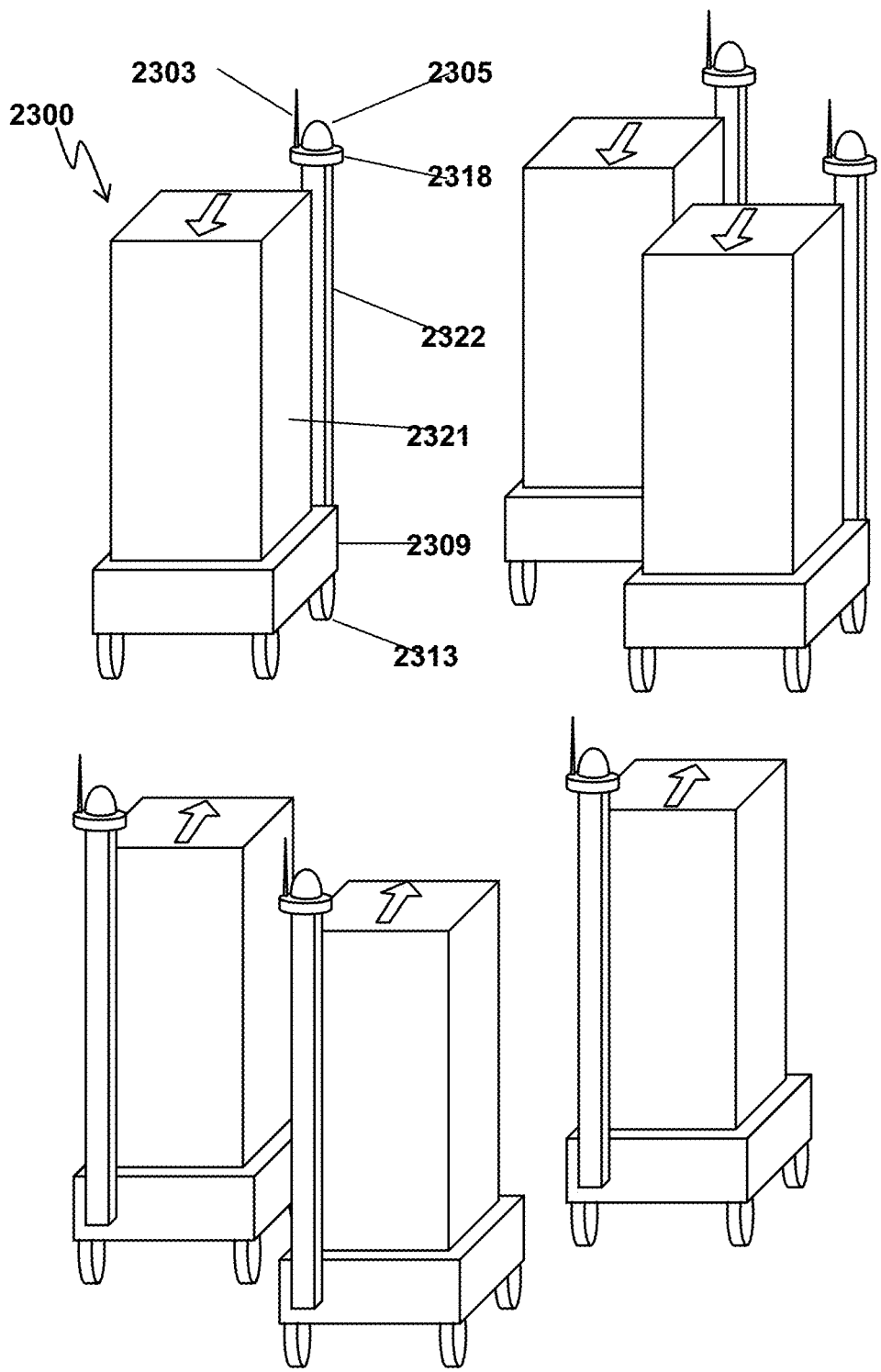
FIG. 23 is a sketch of exemplary mobile robots configured to transport cargo, according to some embodiments.

FIG. 23 is a sketch showing exemplary robots 2300 traveling in opposite directions in a passageway, leading to a potential blockage situation. Fortunately, each robot 2300 includes a localization system according to the present disclosure, and therefore can communicate specifically with each other to resolve the crisis. Each robot includes a chassis 2309 with wheels 2313 and a pole 2322 that extends above the cargo 2321 and supports a wireless transceiver 2303, a 360-degree camera 2318, and a localization signal emitter 2305. Each robot can then detect each other robot's localization signals and wireless messages, thereby determining the identification code and spatial location of each robot. With that knowledge, the robots 2300 can communicate with each other and negotiate to find a resolution to the blockage problem, and can implement the solution cooperatively. For example, in this case a solution may be for one group to form a single-file line along one side of the passageway and the other group to form a single-file line along the other side, so that the two groups could both pass by each other without conflict.

It is generally not necessary for any one of the robots 2300 to assume a dominant role since they are capable, in the envisioned scenario, of resolving the problem in a mutual, egalitarian fashion. However, if a particular one of the robots, such as the first one to perceive the problem, assumes a leadership role, the other robots may be configured to not contest that role but rather to continue to cooperate in resolving the problem. In addition, if the robots cannot find a solution after a predetermined time, such as 1 second, then one or all of them can contact a "supervisor" (not shown) which may be a central computer or a human, for example. The robots 2300 may relay the positions of the various robots to that supervisor so as to explain the problem at hand. The localization data may be especially important in this case, since the supervisor would be unlikely to offer helpful suggestions without knowing which robot is where spatially. With the location data and identification code of each robot 2300, the supervisor can then direct each robot using wireless messages addressed to each robot specifically, thereby resolving the situation. Whether the situation is to be resolved amicably by the robots themselves or by a supervisor, the location data from the localization systems on each robot are critical to finding an efficient solution.

As a further option, the robots 2300 may be configured to record interference events and other problems as they occur, and also to record the resolution achieved, thereby to resolve future similar problems more directly from the records. The robots 2300 may also be configured to convey the problem data and the resolution to other robots that they may subsequently encounter, so that the other robots can benefit from the experience of the participating robots 2300. In this way, the participating robots 2300 may become "teacher" robots while the other robots that receive this information may "learn" from them. By sharing experience in this way, the interconnected robots may develop a "hive mind" of shared experiences and mutually agreed solutions. In the present example, the hive mind solution may be simply "keep to your right when traversing the passageway in either direction", which would resolve future blockage problems without impeding traffic.

Figure 24:
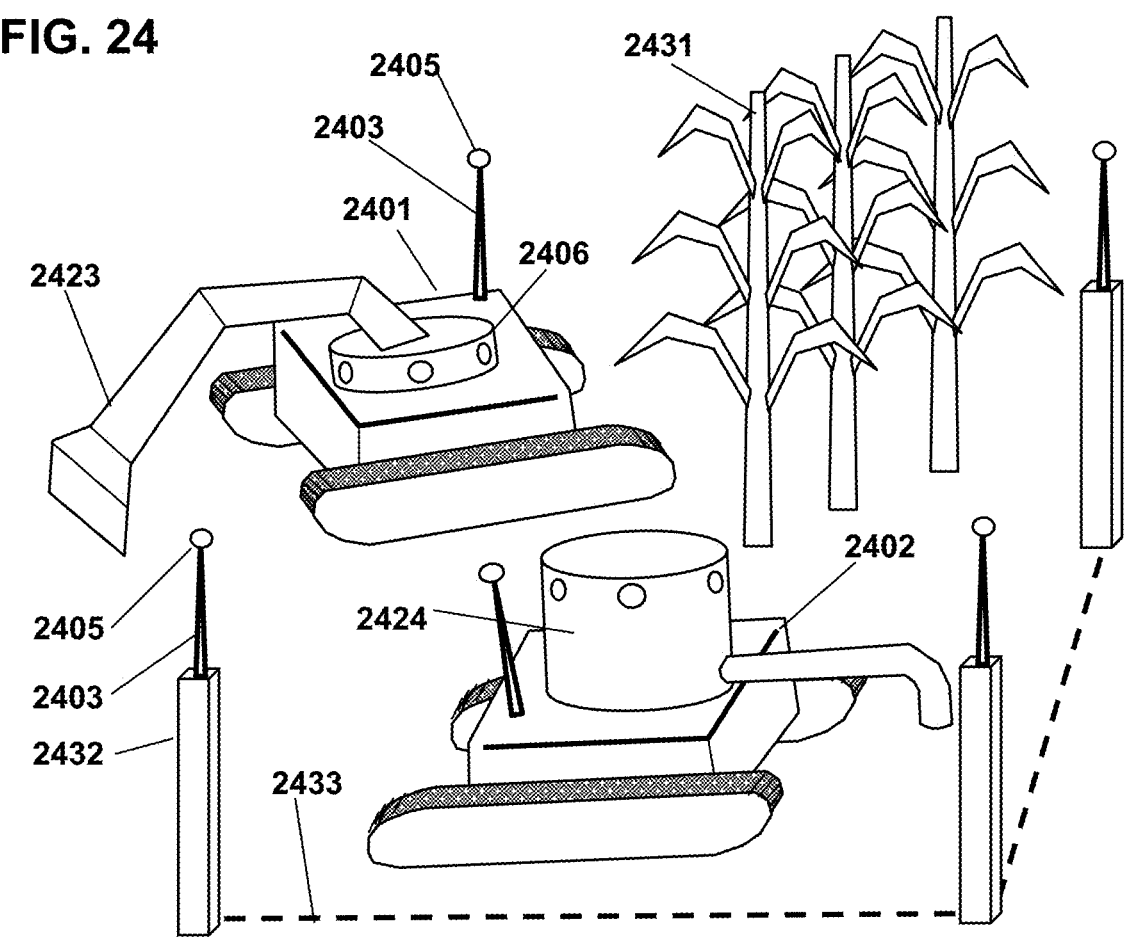
FIG. 24 is a sketch of exemplary robots configured to perform agricultural tasks, according to some embodiments.

FIG. 24 is a sketch of exemplary robots adapted to tasks in the agriculture industry. A first robot 2401 is configured with a hoe 2423 for weed control around crops 2431, and a second robot 2402 includes a water tank 2424 for irrigation. Both robots 2401-2402 include localization systems including wireless transmitter-receivers 2403, localization signal emitters 2405 positioned at the top of the transmitter-receiver antennas 2403. Each robot 2401-2402 further includes an imaging systems 2406 configured to image the other robot, items in the environment, and the localization signals emitted by other robots. The robots 2401-2402 are configured to maintain communication with each other and to monitor the spatial location of each other robot in range, by exchanging wireless messages and localization signals as described herein. The robots 2401-2402 are also configured to image the crops 2431 and other items in the environment such as weeds, obstructions, the farmer, etc. Also shown are boundary posts 2432 demarking the edges 2433 of a field. Each boundary post 2432 includes a partial localization system including a localization signal emitter 2405 atop a wireless transmitter-receiver 2403, but not a signal detector since it is not needed for the boundary posts 2432. The boundary posts 2432 show how far the robots 2401-2402 can proceed without crossing the boundary 2433. In addition, each boundary post responds to a wireless message such as a hailing message by transmitting a wireless message that includes the identification code of that boundary post, and simultaneously emitting a localization signal, thereby indicating to the robots 2401-2402 which boundary post 2432 is located where. For example, a respective boundary post 2432 may be positioned at each end of each row of crops, and may be configured with a different identification code for each, so that a robotic planter can align itself between the appropriate boundary posts 2432 in planting seeds at the proper location. The irrigator robot 2402 can use the boundary posts 2432 to follow a track between the rows, thereby avoiding running over the crops 2431. Likewise the weeder robot 2401 may use the boundary posts 2432 as a guide in judging if a plant is a crop 2431 or a weed, since presumably the crops 2431 are not located between the rows. The cameras 2406 on the weeder robot 2401 may also be used to distinguish weeds from crops.

Figure 25:
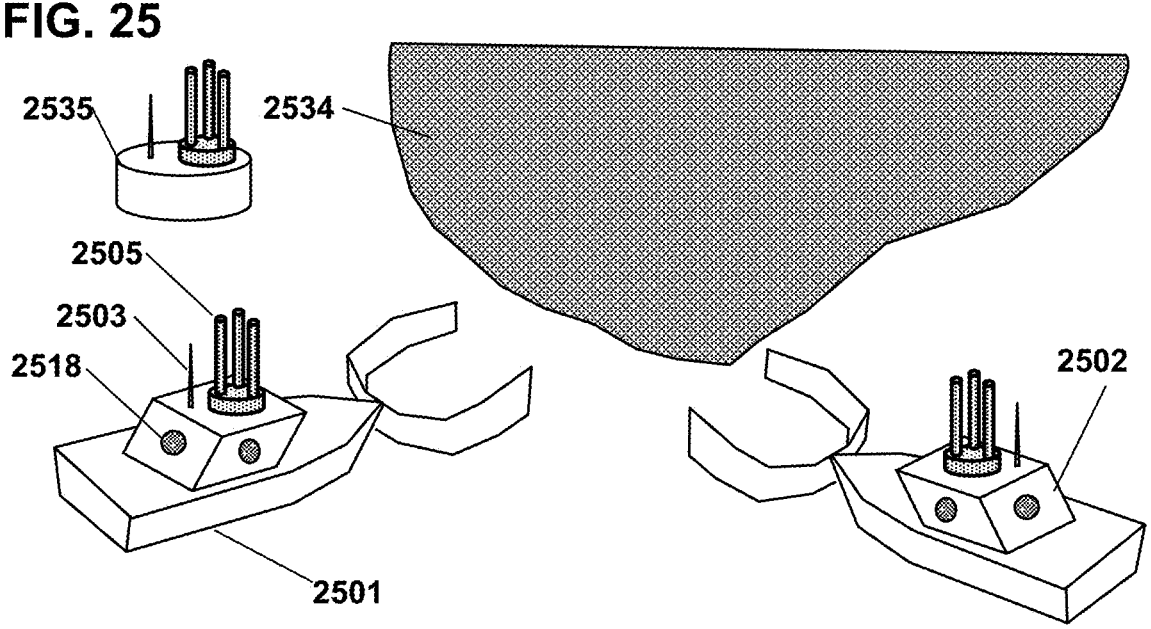
FIG. 25 is a sketch of exemplary robots configured to clean up an oil spill, according to some embodiments.

FIG. 25 is a sketch showing exemplary maritime robots 2501-2502 configured to clean up an oil spill 2534. Each robot 2501-2502 includes a wireless transceiver 2503, a sonic localization signal emitter/detector 2505, and imaging devices 2518. The various robots 2501-2502 can directionally detect sonic localization signals emitted by other robots 2501-2502, and can image the other robots optically using the imaging devices 2518, and thereby localize each robot 2501-2502 in sequence. In addition, each robot can determine the identification code of each other robot 2501-2502 according to a wireless message received synchronously with the localization pulse. The robots 2501-2502 can thereafter exchange specific messages to cooperate and to avoid interfering with each other.

Also shown is an anchored buoy 2535 which also includes a localization system including a localization signal emitter 2505 and a wireless transceiver 2503, but without imaging devices since imaging is not needed in the non-mobile buoy 2535. The buoy 2535 may serve as a homing beacon to guide robots 2501-2502 arriving from a shore station. The buoy 2535 may also serve as a boundary marker to prevent the robots 2501-2502 from drifting into travel lanes, among other functions. Alternatively, the buoy 2535 may include an imaging device, and may be configured to localize the various robots proximate to the buoy 2535, and may be further configured to serve as a coordinator or supervisor by directing the various robots using specific wireless messages to help them perform their task efficiently or to avoid incoming traffic for example. The buoy 2535 may also be configured with higher power radio capability so as to communicate with a land-based station and to report on the progress achieved or problems encountered.

Figure 26:
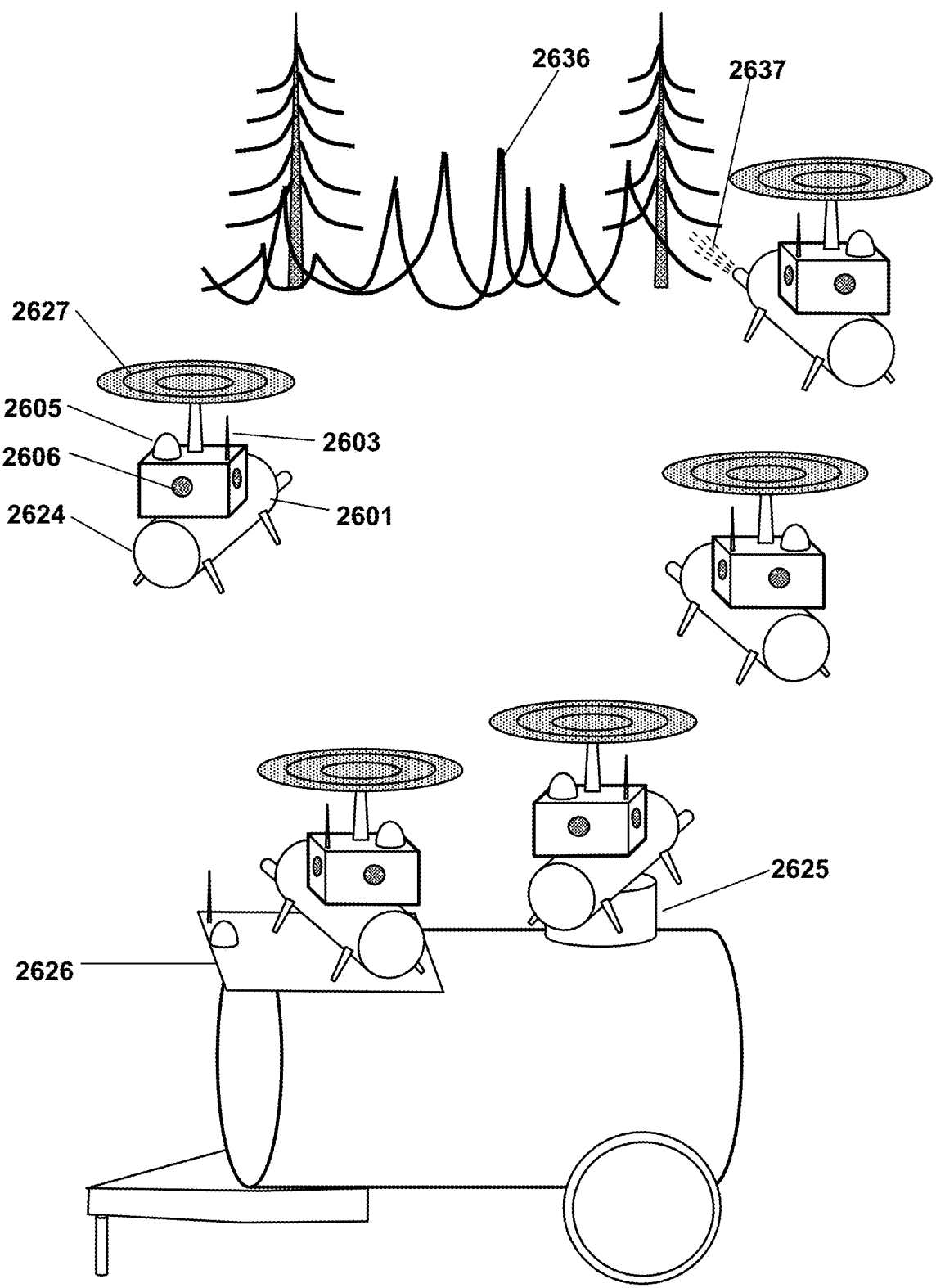
FIG. 26 is a sketch of exemplary robots configured to fight a forest fire, according to some embodiments.

FIG. 26 is a sketch showing a "swarm" or large number of independent exemplary helicopter-like flying drone robots 2601, each configured with a water tank 2624 for fighting a forest fire 2636 with water 2637. Each drone 2601 includes a localization system including a localization signal emitter 2605, a localization signal detector and imager 2606, and a wireless system 2603. Each drone 2601 is shown with a single propeller 2627, but in a practical embodiment they are likely to have 4 or 6 or 8 or more propellers 2627 for stability and greater lifting power. Since the drones 2601 fly in a three-dimensional space, the localization signal emitters 2605 and detectors 2606 may be configured to cover the entire $4\pi$ sphere of directions. This is in contrast to the horizontal angles or 360-degree azimuthal directions of interest to surface-bound robots. Since the swarm of drone robots 2601 are configured to fly autonomously in close quarters and attack the fire 2636 in large numbers together, it is important that they all communicate and keep track of where each other robot 2601 is located three-dimensionally and in real-time, with preferably centimeter precision at sub-second intervals. GPS would not serve, since it is too slow and not precise enough. From each robot's perspective, the most important thing is to keep a safe distance from the other robots and avoid collisions. The geographical position of each robot is less important. Localization systems, as disclosed herein, may be especially useful in managing a swarm-type operation by enabling three-dimensional localization of the other robots relative to each other, rather than according to a geographical map.

Also shown is a water supply tank 2625 with a recharging station 2626. Drones 2601 can return to the water supply tank 2625 to autonomously refill their portable water tanks 2624, and can also stop at the recharging station 2626 when needed to recharge their batteries. The water supply tank 2625 and/or the recharging station 2626 may include a localization signal emitter and wireless transmitter to guide the robots back for resupply.

The swarm of flying drones may additionally be employed in other cooperative operations involving large outdoor areas, such as field spraying operations for weed or pest control, broadcast seeding and fertilization of soil for agriculture or post-fire recovery, environmental monitoring, and aerial surveying, among many other applications. Interdrone localization and communication may be advantageous in such applications to avoid midair collisions, cooperatively ensure coverage of areas not yet treated, avoid repeating areas that have already been treated, detect targeted features of the land or vegetation, find and localize problem areas, and many other advantages. In addition, drone swarms with mutual localization and communication may be applicable to search-and-rescue operations such as finding and localizing lost hikers, post-disaster victim search, earthquake damage assessment, and related applications. The localization systems and methods disclosed herein may enable the drones to detect and avoid interfering with non-drone vehicles such as human-piloted aircraft and emergency vehicles, thus avoiding a common hazard in chaotic post-disaster scenarios.

Figure 27:
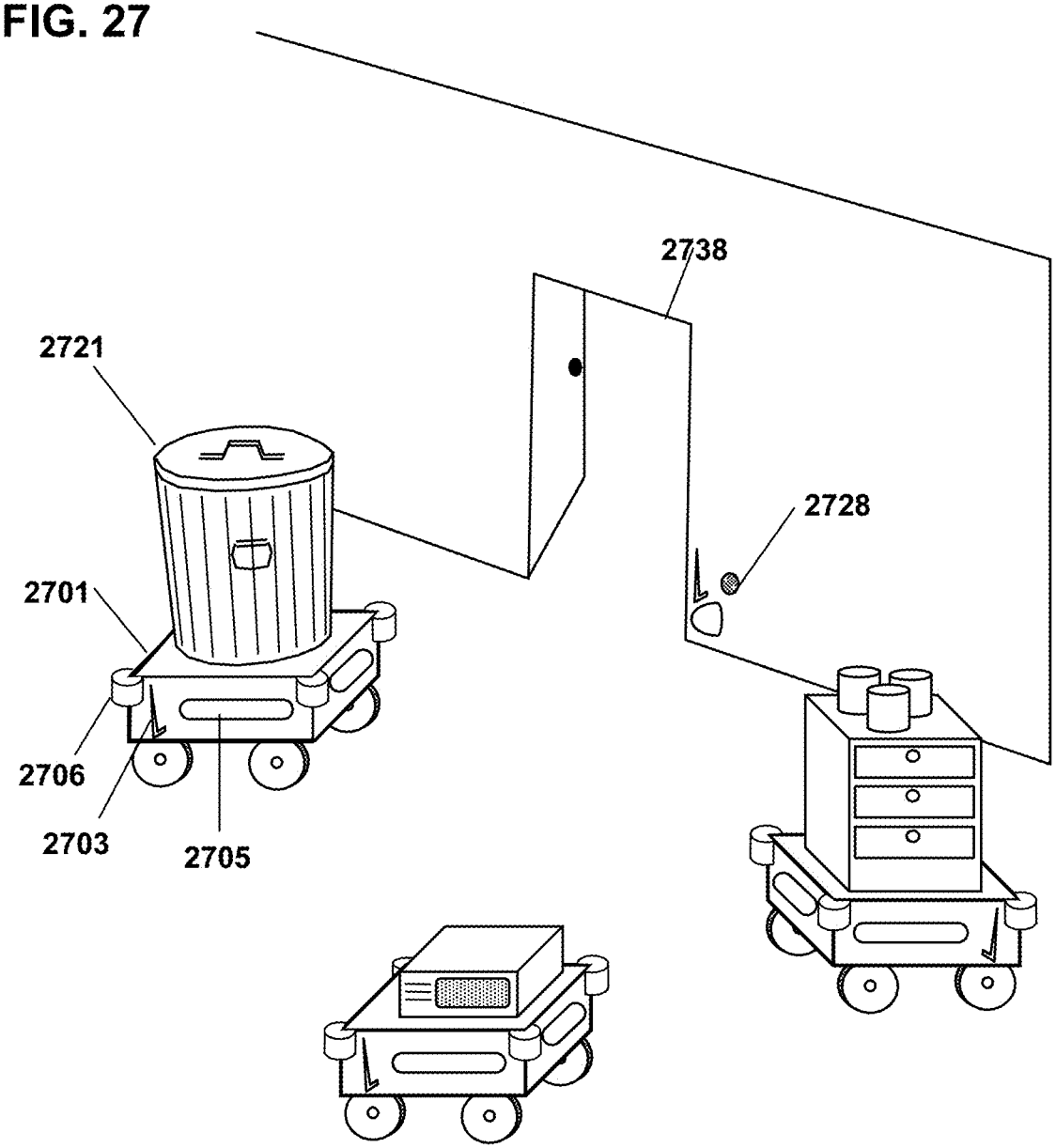
FIG. 27 is a sketch of exemplary robots configured to transport items in a hospital environment, according to some embodiments.

FIG. 27 is a sketch of an indoor delivery application such as a hospital. Mobile robots 2701 are configured to transport cargo items 2721 such as food trays, medicines, instruments, trash, patients, etc. Each robot 2701 includes a wireless system 2703, a large optical localization signal emitter 2705 spanning each side of the robot 2701, and a camera plus localization signal detector 2706 mounted on each corner of the robot 2701. Thus, each robot 2701 can exchange localization signals and wireless messages and thereby localize each other including determining their identification codes. This is important since the robots 2701 are likely to encounter each other frequently in the crowded and kinetic environment of a health-care facility, where interference must be avoided. Also, each robot 2701 may be configured to alert the other robots 2701 as to the importance of the cargo 2721 for appropriate prioritization. For example, transporting a defibrillator instrument may be more time-critical than taking out the trash. The other robots 2701 may then make way for the high-priority items as needed. It would be difficult to arrange such cooperation without the localization systems disclosed herein.

Also shown is a door 2738 leading, for example, to a patient room or the pharmacy for example. The door 2738 includes a localization system 2728 positioned to help guide the robots 2701 to the intended destination. Especially in a hospital application, it is important to ensure that the correct robot 2701 finds the correct door 2738, to avoid misapplication of medicines for example. The door-mounted localization system 2728 is configured to know which cargo 2721 is intended for that particular door 2738 and thus serves as a redundant security gate. In addition, the door-mounted localization system 2728 may be configured to record data such as which robot 2701 with which cargo 2721 passed through the door 2738 at what time, and in which direction, thereby providing a valuable sequence record of activities on the hospital floor.

In related applications, mobile robots having mutual localization systems as disclosed herein may be applicable to other delivery or security applications involving large institutions. For example, in a prison, mobile robots can also deliver food trays to cells and retrieve trash without exposing staff. For security, mobile robots may circulate continuously to detect problems such as a door left ajar, prisoners preparing to escape, a sick prisoner needing help, fights developing, or other illegal activity. The mobile robots may also detect maintenance problems such as a water leak or a burned-out light or clutter in a passageway before they become a security issue. In each such application, the ability of the robots to localize each other and to cooperatively communicate may enable improved performance as well as avoided secondary problems such as robots interfering with or colliding with each other.

Figure 28:
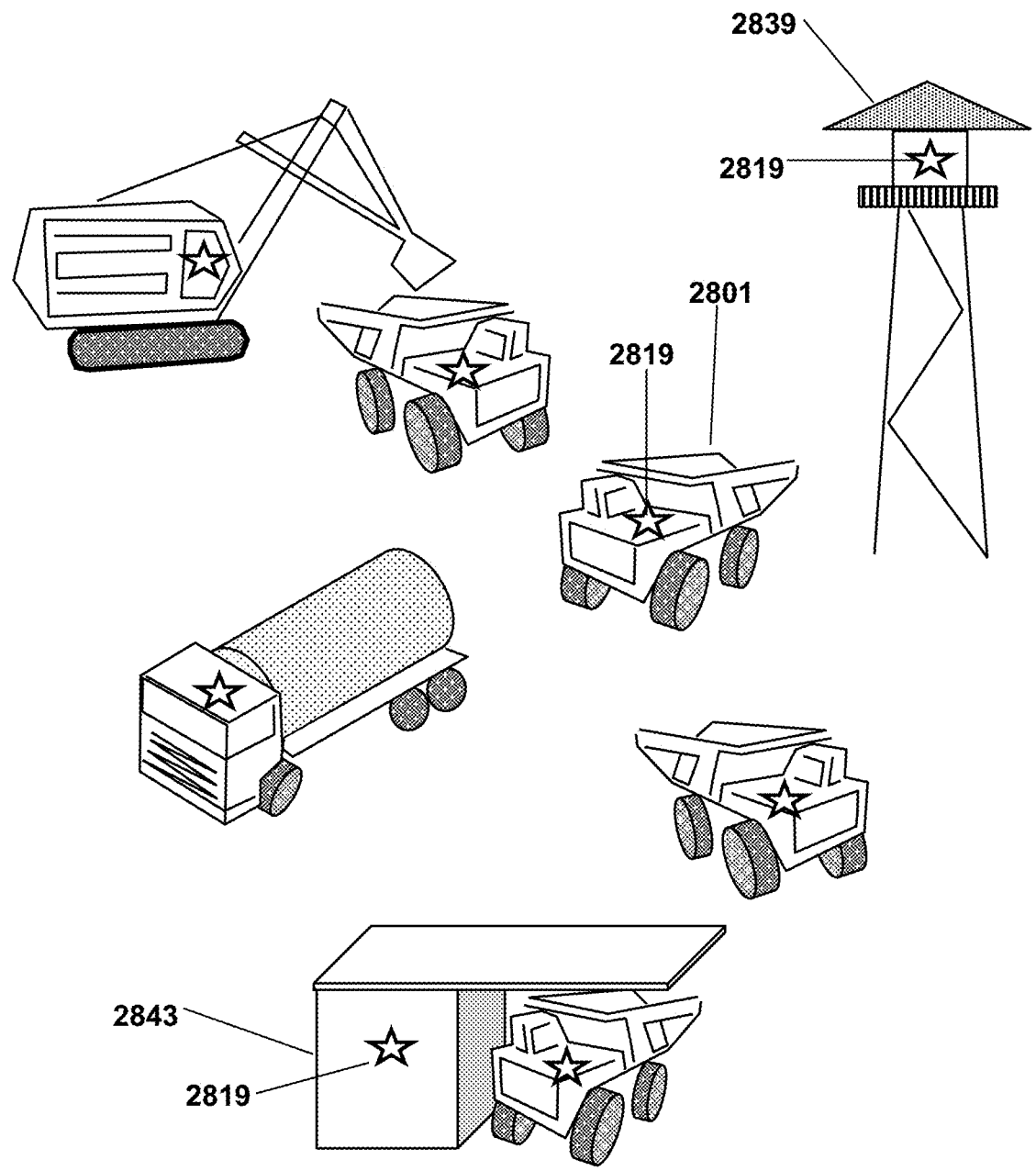
FIG. 28 is a sketch showing exemplary heavy equipment in a quarry environment, according to some embodiments.

FIG. 28 is a sketch showing numerous robots 2801 such as heavy equipment in a quarry or strip-mining or road-building or other heavy outdoor operation. The robots 2801 may include dump trucks, steam shovels, water and fuel tanks, and other mobile robots working the land. Humans are typically excluded for safety reasons. Instead, each robot 2701 includes a localization system 2819, indicated as a star, by which the robot 2801 can communicate with and cooperate with the other robots, thereby carrying out each task and managing the operation while avoiding interference and collisions.

In large industrial operations such as a quarry, the localization systems 2819 may use high-frequency RF as the localization signal, and the corresponding localization signal detectors may be directional antennas or antenna arrays. The RF localization option may be feasible with large, high-power equipment as shown, and may be advantageous in a large dirty noisy outdoor industrial site where localization signals are required to reach larger distances than could be reliably obtained with, for example, sonic signals. In addition, dust clouds may obscure optical localization signals such as visible or IR signals but have no effect on RF. Heavy-equipment robots 2801 generally have sufficient size for spaced-apart antennas to determine the direction of a high-frequency RF signal, as well as ample power available. An exemplary all-RF localization system may include wireless communication in the usual HF-VHF range and localization signals in the higher-frequency UHF-THF range. Alternatively, the wireless and localization signals may be in the same band and use the same emitters and receivers. In one embodiment, the wireless message itself serves as the localization signal, and each receiving robot is then configured to receive such wireless messages and also determine their direction. Such an all-RF localization system would be immune to noise and dust, could readily communicate across hundreds of meters or more, and may be well-matched to the requirements of a quarry site or other heavy construction site with numerous large and powerful machines at work.

Also shown is a watch-tower 2839 configured to monitor the various robots 2801 and redirect activities as needed. The watch-tower 2839 may include a supervisory computer and/or a human manager depending on the type of monitoring needed. The watch-tower 2839 includes a localization system 2819 so that the supervisor can transmit a hailing message when needed, thereby causing the robots 2801 to report their location using localization signals and their identity using wireless messages, on request. In this way the supervisor, either computer or human, can keep track of which robot 2801 is where in the quarry and which robot 2801 is doing what task at each moment.

Also shown is a refueling station 2843 with a localization system 2819 included so that the robots 2801 can find the refueling station and autonomously get re-fueled.

Another similar example is a road-grading and road-paving activity in which plows, graders, asphalters, rollers, line-painters, and the like may be active autonomously. Likewise an earth-moving activity, such as site preparation before construction of a bridge or building, may employ a swarm of heavy-equipment robots with mutual localization capability using the disclosed systems and methods. Large constructions sites, such as dam construction, highway overpass construction, high-rise building construction and the like, may advantageously employ mobile robots for hauling of concrete and other construction materials, removal of rocks and clutter, and delivery of non-robotic equipment where it is needed. Cooperative robots may also be employed in direct construction tasks such as rebar welding, wood cutting, concrete laying or leveling or sawing or breakup, mortaring and setting cinder blocks or bricks, cutting or fastening light steel framing. positioning or drilling or bolting heavy steel structures, and many other tasks that require communication and localization among autonomous robots.

Figure 29:
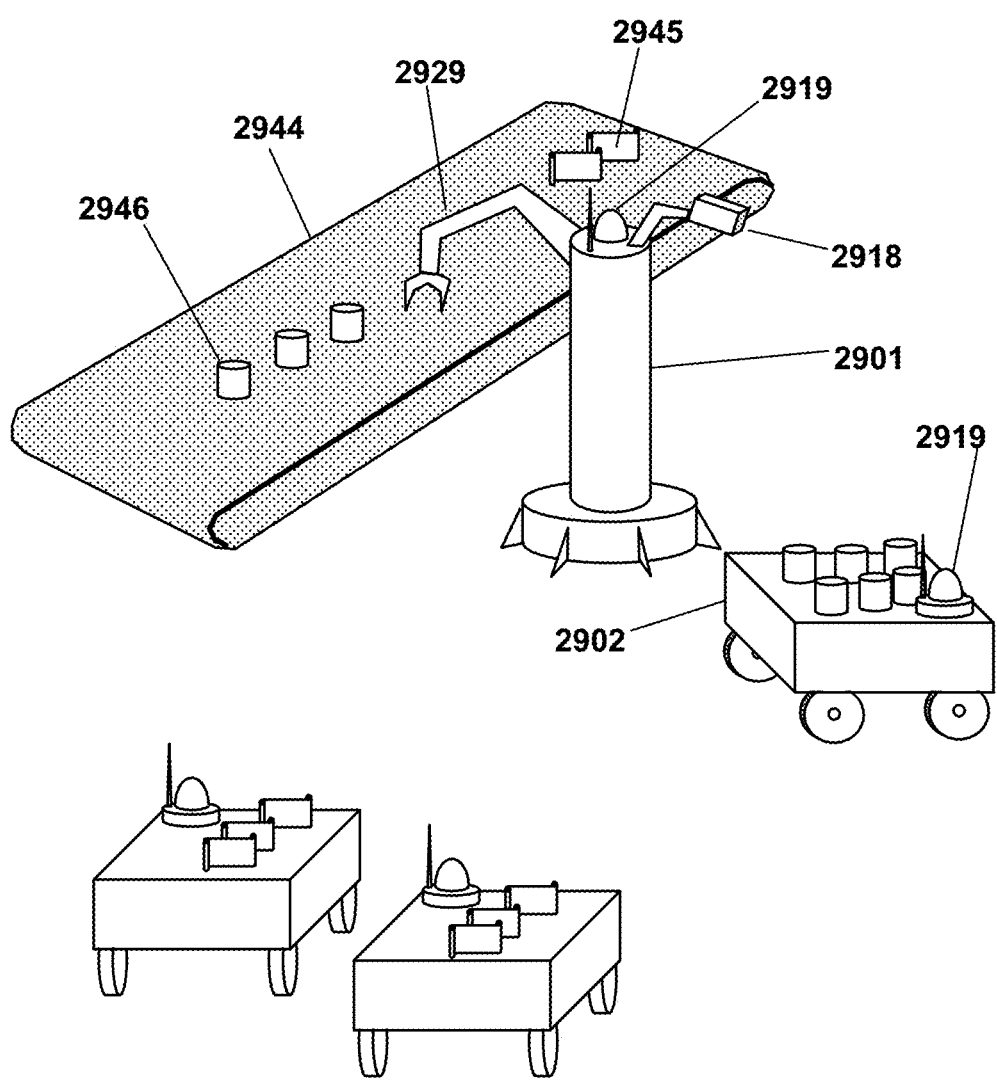
FIG. 29 is a sketch showing exemplary mobile robots assisting a non-mobile robot, according to some embodiments.

FIG. 29 is a sketch of an automated factory scenario in which exemplary mobile and non-mobile robots cooperate using localization signals. Depicted is a non-mobile robot 2901 which includes a grasping tool 2929, an articulated (aimable) camera 2918, and a localization system 2919. Also shown are mobile robots 2902 configured as carts, which also include a localization system 2919. The non-mobile robot 2901 performs a manufacturing task in cooperation with the mobile robots 2902, such as lifting cans 2946 off of a conveyor belt 2944 and placing them on a mobile robot 2902, and taking a scroll piece 2945 off of another mobile robot and placing it on the conveyor belt 2944. Each mobile robot 2902 brings the scroll pieces 2945 and then receives the cans 2946, then scurries away to make room for the next mobile robot 2902. The mobile and non-mobile robots 2901-2902 use the localization systems 2919 continually to manage the operation, avoid interference, arrange input and output sequencing, adjust the positioning to be within reach of the grasping tool 2929, and otherwise perform their respective tasks.

Additional applications in manufacturing, for autonomous mobile robots as disclosed herein, may include devices to sort and count the final products, then pack or box them and seal for final delivery, which may involve cooperation with other robots that bring the products to the packing robot, and other robots to collect the boxed goods for shipping. Yet other robots may be tasked with receiving components, unboxing and counting them, then sorting or storing or arranging for another robot to transport the components to an assembly station where they are needed by a third robot for assembly into the final product. In each case, cooperation among the interacting mobile and non-mobile robots may be enhanced by the ability to specifically communicate with other localized robots using the systems and methods disclosed herein. Indeed, many cooperative tasks among autonomous robots may be impossible without such localization.

Figure 30:
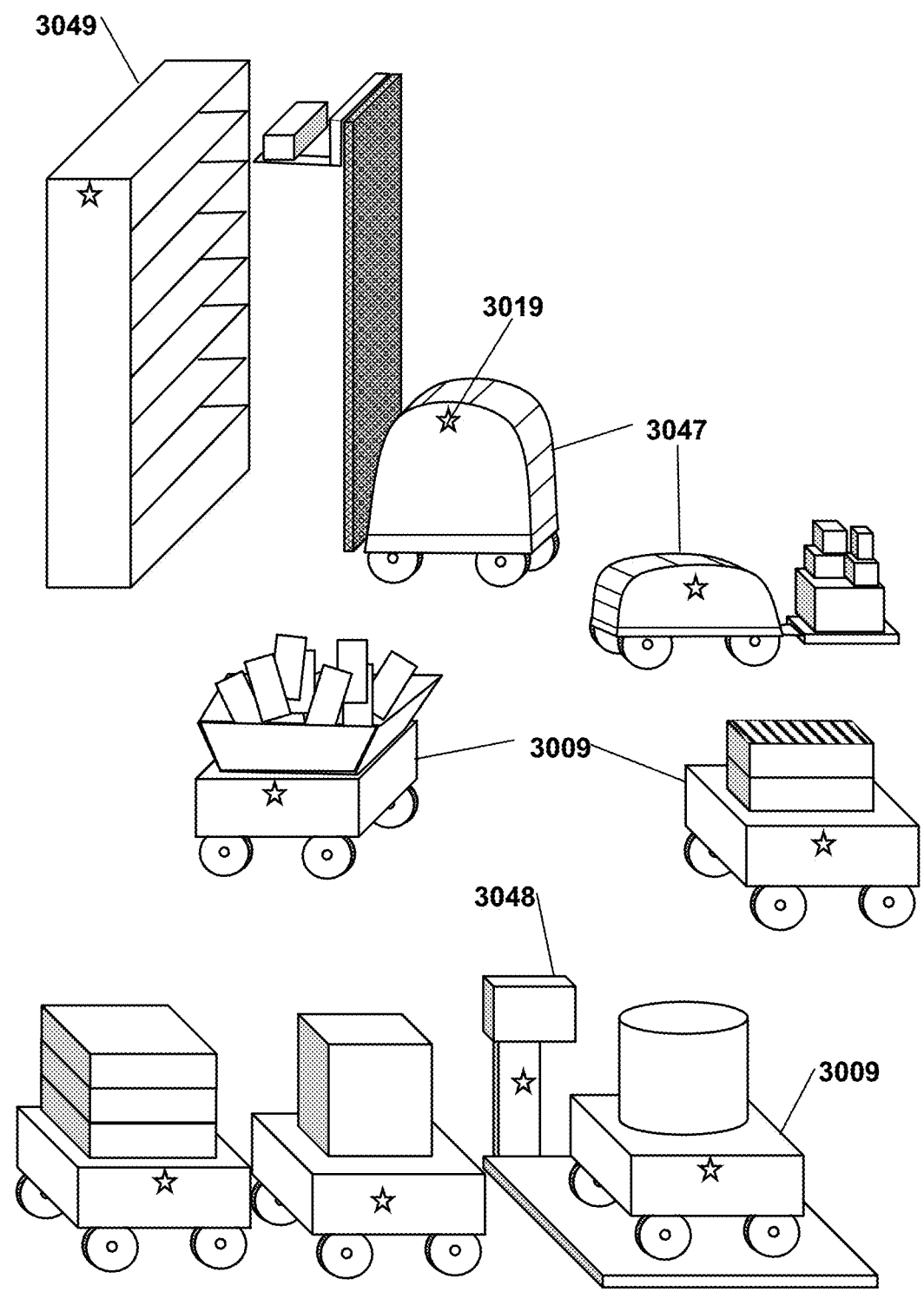
FIG. 30 is a sketch showing exemplary mobile robots working in a logistical center, according to some embodiments.

FIG. 30 is a sketch showing a busy automated transshipment center such as a postal service center, an overnight carrier hub, a product fulfillment warehouse, or other logistical center handling large numbers of items with large numbers of mobile robots in cooperation, each with an exemplary localization system 3019 according to the present disclosure. Depicted are mobile robots configured as carts 3009 adapted to transport loose goods such as unsorted letters, stacked or boxed goods such as sorted letters, or other items of any description. Also shown are pallet movers 3047 configured to move pallets of goods and optionally to lift packages or pallets onto shelving 3048 or other vertical or horizontal storage areas. A weighing station 3048 is configured to weigh a mobile robot such as a cart 3009 plus its burden, and then to subtract the weight of the cart 3009. However, each cart 3009 may have a different weight. Therefore, the weighing station needs to know which cart 3009 is involved, in order to arrive at an accurate net weight. Accordingly, each cart 3009, pallet mover 3047, and fixed item 3048-3049 is equipped with a localization system 3019 depicted as a star. The localization systems 3019 enable each mobile robot 3009-3047 to communicate and cooperate with each other, and to correctly locate each fixed asset 3048-3049 by communicating them specifically. For example, the weighing station 3048 communicates with whichever cart 3009 is currently being weighed to determine its identification code, and then using a stored correlation table, the weighing station 3048 subtracts the known weight of that particular cart 3009 from the gross weight to obtain the correct net weight of the goods.

A similar application may be a sawmill in which cooperating robots are tasked with unloading logs from logging trucks (which may be human-driven or autonomous), sizing and grading the logs, scanning them for metal or rocks, then providing them to an autonomous sawing operation. Further robots may collect the sawn lumber, sort and stack it in a drying kiln or outdoor rack, and then collect the dried product. Further robots may be tasked with chipping the trimmings and pressing into particle-board. At each station, multiple mobile and fixed-site robots interact to process the goods, which requires the close cooperation in positioning and timing that may be provided by the localization systems and methods disclosed herein.

Figure 31:
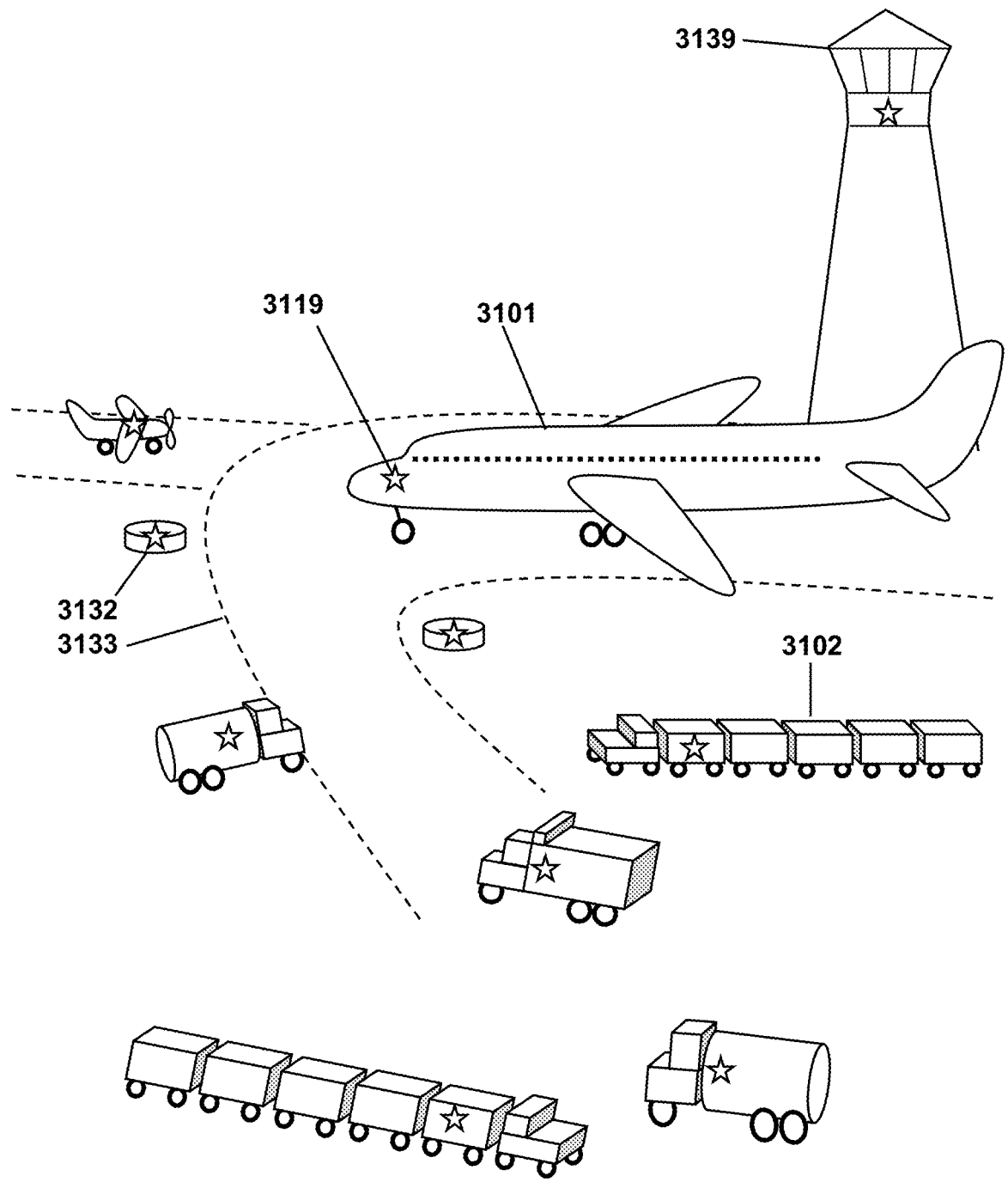
FIG. 31 is a sketch showing an airport tarmac including exemplary robotic and semi-autonomous vehicles.

FIG. 31 is a sketch of an airport including various vehicles and robots with exemplary localization systems included. At an airport, there are typically multiple vehicles moving around, presenting a continual risk of a collision. Aircraft 3101 are taxiing to and from the runway, baggage trains 3102 and other vehicles are streaming between aircraft and terminal, with fuel trucks and food trucks and sanitation trucks moving independently around the tarmac, all of which represent a complex hazard. Greatly enhanced safety can be obtained by installing a localization system 3119 according to the present disclosure, depicted as a star on each vehicle 3101-3102, so that they can maintain real-time awareness of the other vehicles in proximity. Then, if one of the vehicles detects an imminent collision with a second vehicle, the first vehicle can send an emergency wireless message specifically to the second vehicle, causing the second vehicle to sound a collision alarm which causes the driver of the second vehicle to stop. Alternatively, the second vehicle may be configured to respond automatically to such an emergency wireless message addressed specifically to the second vehicle, for example causing the second vehicle to stop automatically. In this way an unnecessary collision may be avoided.

In addition, most or all of the vehicles at an airport are likely to become autonomous in the future, with the driver of each vehicle (baggage haulers, food trucks, etc.) being replaced by autonomous processors. Without a human driver in control, the need for close cooperation with localization will be even more critical. The localization systems are needed to provide location data on each vehicle, enable specific wireless communication between them, and avoid many ground hazards.

Also shown are location markers 3132 which include localization systems 3119 and are configured to assist aircraft 3101 and other vehicles 3102 to remain within marked lane boundaries 3133 by exchanging wireless messages and localization signals. A control tower 3139, configured with a localization system 3119, can manage ground operations by localizing and identifying each aircraft or vehicle 3101-3102 and recognize potential hazards in time to avoid them.

In addition, cooperating mobile robots may be employed for baggage handling operations, such as sorting and transporting baggage deposited by passengers at check-in, transporting to an inspection station for scanning and the like, then stacking of baggage into containers for easy loading onto planes. Upon arrival, further robots may then separate the bags in the terminal and place them gently onto belts for passengers to retrieve. At each stage of the baggage handling operations, coordination between the robots would be greatly enhanced by the ability to identify, localize, and specifically communicate with each other robot with which it interacts.

Figure 32:
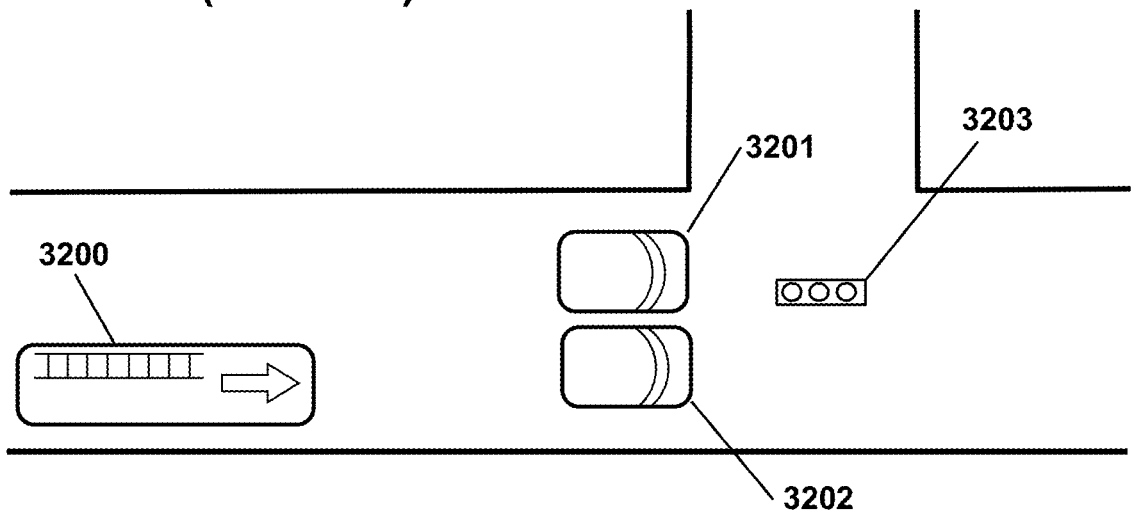
FIG. 32 is a sketch showing an emergency vehicle being blocked by prior-art vehicles at an intersection.

FIG. 32 is a schematic showing a common problem when a prior-art emergency vehicle 3200 such as a fire engine is blocked by other prior-art vehicles 3201-3202 which are stopped at a stoplight 3203. The stopped vehicles 3201-3202 may be autonomous or human-driven. On a roadway, this blockage problem generally does not occur because human drivers and autonomous vehicles have been taught to pull to the right and stop, thereby letting the emergency vehicle pass by. But at a stoplight 3203, most drivers are reluctant to dash across the intersection or take any other action while sirens are sounding, unless specifically directed to do so. Autonomous vehicles are also generally programmed not to move until the emergency situation has lifted. Many emergency vehicles are equipped with strobe lights that flash at a particular frequency, and many traffic signals are configured to respond to the strobe flashes by turning green toward the emergency vehicle and red everywhere else. However, this is NOT sufficient to prompt most drivers or autonomous vehicles to move or take any action on their own initiative. Careful drivers have no way of knowing whether the green light means they should dash forward or that it has simply cycled to green. Any action could be the wrong action, which might lead to a collision if another emergency vehicle is approaching from a different direction. Lacking means for specifically communicating with the stopped vehicles 3201-3202, the emergency vehicle 3200 remains blocked.

Figure 33:
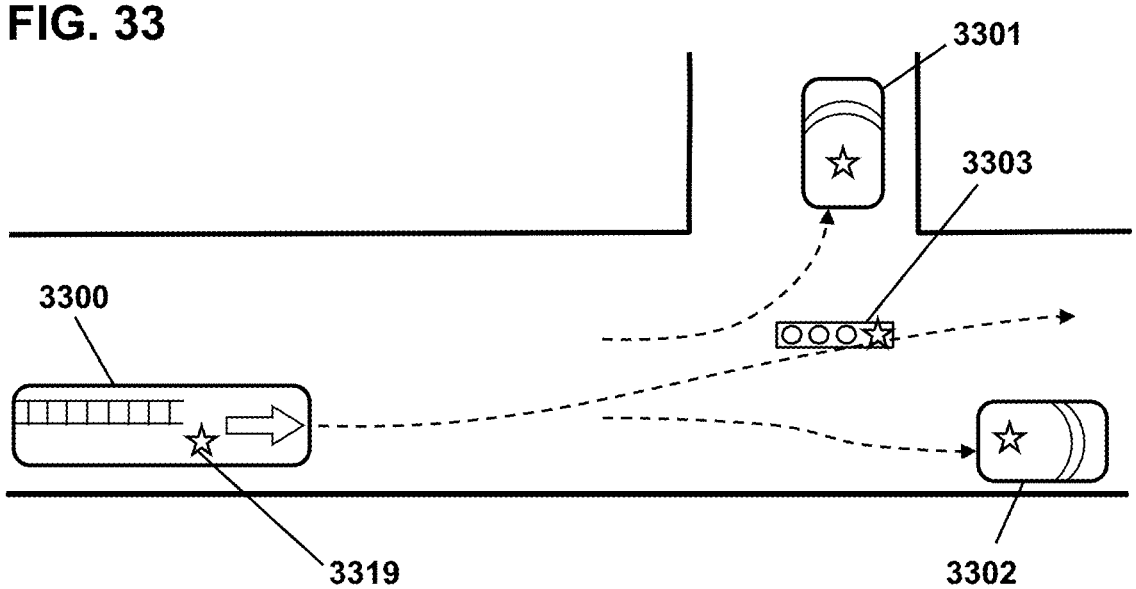
FIG. 33 is a sketch showing an emergency vehicle that includes an exemplary localization system direction other vehicles to get out of the way, according to some embodiments.

FIG. 33 shows how the blockage problem can be resolved using the systems and methods disclosed herein. Again a fire engine 3300 is approaching an intersection blocked by vehicles 3301-3302, however now each vehicle 3300-3302 includes a localization system 3319 indicated by a star. The emergency vehicle 3300 quickly establishes communication with each of the other vehicles 3301-3302, and then orders them to proceed. For example, the emergency vehicle 3300 may instruct the first vehicle 3301 to go ahead and turn left, and may instruct the second vehicle 3302 to proceed forward and then pull over to the right. This would immediately open up a path for the emergency vehicle 3300 to proceed, as indicated by dashed arrows.

In addition, the stoplight 3303 may further include a localization system so that the emergency vehicle 3300 could control it to reinforce the instructions to the vehicles 3301-3302. For example, when the emergency vehicle 3300 instructs the first vehicle 3301 to turn left, the emergency vehicle 3300 could simultaneously turn on the left green arrow and make it flashing to show that it is safe for the first vehicle 3301 to proceed left. After instructing the second vehicle 3302 to move forward, the emergency vehicle 3300 could control the stoplight 3303 and make the green light flash to again reinforce the instructions. Then, after passing through the intersection, the emergency vehicle may then cause the stoplight 3303 to turn red in all directions for a few seconds, thereby to prevent other people from chasing the emergency vehicle (a common unsafe sport). The red light period would also give the other two vehicles 3301-3302 a chance to return to lanes without being pressured by approaching traffic.

An additional emergency operation involving autonomous vehicles may be to contain an escaping criminal in a high-speed chase scenario. Human-driven vehicles are generally not allowed to closely approach the speeding vehicle, due to safety concerns. Consequently, in some cases, a highway chase may last hours and span large distances, continually placing other motorists at risk. In some cases, officials may have to let the escapee go rather than place others at risk. In such cases, a set of autonomous vehicles with mutual cooperation may advantageously be employed to surround the speeding vehicle, by positioning in front and behind and both sides, then gradually slow to a stop in close coordination, thereby forcing the escaping vehicle to stop as well. With such a maneuver, the autonomous vehicles may bring the chase to a rapid and safe conclusion.

The localization systems and methods disclosed herein can provide numerous benefits not available heretofore, by enabling each mobile robot in a cohort of mobile robots to determine the identity and spatial location of other robots, and to communicate specifically with each of the other robots, and to cooperatively manage tasks and resolve problems.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where robot controls are contemplated, the plural inputs may allow plural users to input relevant data at the same time.

It is to be understood that the foregoing description is not a definition of the invention but is a description of one or more preferred exemplary embodiments of the invention. The invention is not limited to the particular embodiments(s)

disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A first robot, proximate to a plurality of mobile robots, the plurality of mobile robots including a particular mobile robot, the first mobile robot configured to:
   a. detect one or a plurality of pulses of visible or infrared light emitted by the particular mobile robot;
   b. determine, by a processor, a direction of the one or the plurality of pulses of visible or infrared light;
   c. determine, by the processor, according to the direction, which mobile robot, of the plurality of mobile robots, is the particular mobile robot;
   d. determine, by the processor, according to the one or the plurality of pulses of visible or infrared light, a code representing a wireless address of the particular mobile robot; and
   e. transmit, according to the wireless address of the particular mobile robot, a wireless message to the particular mobile robot.

2. The first robot of claim 1, wherein the wireless message is transmitted according to 5G or 6G technology.

3. The first robot of claim 1, wherein the wireless message includes a wireless address of the first robot.

4. The first robot of claim 3, wherein:
   a. the wireless address of the first robot is configured to specifically and persistently identify the first robot; and
   b. the wireless address of the particular mobile robot is configured to specifically and persistently identify the particular mobile robot.

5. The first robot of claim 1, wherein the first robot is a mobile robot.

6. The first robot of claim 5, wherein the first robot comprises wheels, a motor operably connected to the wheels, an energy source operably connected to the motor, and a processor operably connected to the motor.

7. The first robot of claim 1, wherein the first robot is a non-mobile robot permanently attached to a fixed structure.

8. The first robot of claim 7, further configured to broadcast, to the plurality of mobile robots, a third wireless message indicating:
   a. the wireless address of the first robot;
   b. an indication that the third wireless message is transmitted by the first robot; and
   c. an indication that the first robot is non-mobile.

9. The first robot of claim 1, further configured to include:
   a. a wireless receiver configured to receive a second wireless message transmitted by the particular mobile robot;
   b. a camera configured to acquire an image of the plurality of mobile robots; and
   c. an emitter configured to transmit one or a plurality of pulses of visible or infrared light, the one or the plurality of pulses comprising a code that represents a wireless address of the first particular robot.

10. The first robot of claim 9, wherein the camera is configured to acquire, responsive to pulsed visible or infrared light, the image of the plurality of mobile robots.

11. The first robot of claim 10, wherein the camera is further configured to indicate, on the image, a position of the one or the plurality of pulses of visible or infrared light emitted by the particular mobile robot.

12. The first robot of claim 11, further configured to determine which mobile robot, of the plurality of mobile robots, is the particular mobile robot by comparing, in the image, positions of the mobile robots with the position of the pulse or pulses of visible or infrared light.

* * * * *